(12) United States Patent
Doi

(10) Patent No.: US 7,300,145 B2
(45) Date of Patent: *Nov. 27, 2007

(54) TREATMENT LIQUID FOR INK JET, TREATMENT LIQUID TANK FOR INK JET, INK SET FOR INK JET, INK TANK FOR INK JET, INK JET RECORDING METHOD, AND INK JET RECORDING APPARATUS

(75) Inventor: Takatsugu Doi, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 177 days.

This patent is subject to a terminal disclaimer.

(21) Appl. No.: 11/202,528

(22) Filed: Aug. 12, 2005

(65) Prior Publication Data

US 2006/0203055 A1    Sep. 14, 2006

(30) Foreign Application Priority Data

Mar. 10, 2005  (JP)  ............................. 2005-067919
Mar. 25, 2005  (JP)  ............................. 2005-090267

(51) Int. Cl.
  *G01D 11/00*  (2006.01)
(52) U.S. Cl. ..................... 347/100; 347/96; 106/31.13; 523/160
(58) Field of Classification Search ................ 347/100, 347/96, 95, 101; 106/31.6, 31.13, 31.27; 523/160
See application file for complete search history.

(56) References Cited

U.S. PATENT DOCUMENTS

| | | | |
|---|---|---|---|
| 4,325,735 A | 4/1982 | Ohta et al. | |
| 5,198,023 A | 3/1993 | Stoffel | |
| 5,320,668 A | 6/1994 | Shields et al. | |
| 5,518,534 A | 5/1996 | Pearlstine et al. | |
| 5,536,306 A | 7/1996 | Johnson et al. | |
| 5,555,008 A | 9/1996 | Stoffel et al. | |
| 5,679,143 A | 10/1997 | Looman | |
| 5,976,231 A | 11/1999 | Schwarz | |
| 6,022,908 A | 2/2000 | Ma et al. | |
| 6,048,388 A | 4/2000 | Schwarz | |
| 6,367,923 B1 | 4/2002 | Koitabashi | |
| 6,573,405 B1 | 6/2003 | Abbott et al. | |
| 7,048,452 B2 | 5/2006 | Malagrino, Jr. | |
| 2004/0035293 A1 | 2/2004 | Davis | |
| 2004/0244645 A1 | 12/2004 | Doi et al. | |
| 2005/0166792 A1 | 8/2005 | Doi | |
| 2005/0183628 A1 | 8/2005 | Lchmann et al. | |
| 2005/0264630 A1 | 12/2005 | Doi | |
| 2006/0023042 A1 | 2/2006 | Doi | |

(Continued)

FOREIGN PATENT DOCUMENTS

JP    63-265681    11/1988

(Continued)

*Primary Examiner*—Manish S. Shah
(74) *Attorney, Agent, or Firm*—Fildes & Outland, P.C.

(57) ABSTRACT

The invention provides a treatment liquid for ink jet, which includes at least an organic acid having a pKa value of 4.5 or less, a nonionic substance, and water, wherein: (I) the treatment liquid has a pH value of 1.5 to 5.5, (II) the nonionic substance has a weight-average molecular weight of 300 or more but less than 5,000, and (III) a difference in solubility parameter (SP value) between a fundamental skeleton part of the organic acid excluding its acid group and the nonionic substance is 0.01 to 0.75.

19 Claims, 5 Drawing Sheets

U.S. PATENT DOCUMENTS

| | | |
|---|---|---|
| 2006/0066661 A1 | 3/2006 | Yamashita et al. |
| 2006/0139426 A1 | 6/2006 | Doi |

FOREIGN PATENT DOCUMENTS

| | | |
|---|---|---|
| JP | 2711888 | 9/1990 |
| JP | 08-072233 | 3/1996 |
| JP | 08-269377 | 10/1996 |
| JP | 09-176531 | 7/1997 |
| JP | 2667401 | 12/1998 |
| JP | 2000-109735 | 4/2000 |
| JP | 2001-294788 | 10/2001 |
| JP | 2004-339346 | 12/2004 |

TREATMENT LIQUID FOR INK JET, TREATMENT LIQUID TANK FOR INK JET, INK SET FOR INK JET, INK TANK FOR INK JET, INK JET RECORDING METHOD, AND INK JET RECORDING APPARATUS

CROSS-REFERENCE TO RELATED APPLICATION

This application claims priority under 35 USC 119 from Japanese Patent Application Nos. 2005-067919 and 2005-090267, the disclosures of which are incorporated by reference herein.

BACKGROUND OF THE INVENTION

1. Field of the Invention

The invention relates to a treatment liquid for ink jet, a treatment liquid tank for ink jet, an ink set for ink jet, an ink tank for ink jet, an ink jet recording method, and an ink jet recording apparatus.

2. Description of the Related Art

Ink jet systems for ejecting ink from an ink ejection port formed of a nozzle, a slit or a porous film have been used in many printers due to their being small-sized and inexpensive. Of these ink jet systems, a piezo ink jet system for ejecting ink by utilizing the deformation of a piezoelectric element and a thermal ink jet system for ejecting ink by utilizing the boiling phenomenon of an ink by way of thermal energy are excellent in a high resolution and a high-speed printing property.

At present, speedup and picture quality improvement on plain paper are taken as one of the important objectives of an ink jet printer. In order to attain this objectives, there has been proposed an image forming method of adhering a liquid containing a compound having a cationic group onto a recording medium and then adhering an ink containing an anion dye immediately after the liquid has permeated into the recording medium and is thus present in the medium, and has left the surface of the medium, thereby forming an image (see Japanese Patent No. 2667401, for example). In this method, in some cases in which the time required for drying of an ink is shortened, the density of an image is insufficient. In some cases in which printing is carried out with a small amount of drops, moreover, the long term ejecting property is insufficient.

For the purpose of high-speed drying, high optical density and higher image qualities, a color ink set has been proposed wherein the black ink contains water and a water-soluble solvent and has a drying time of 5 seconds or less in plain paper, and the color ink contains a coloring material, water, a water-soluble solvent, and a flocculating agent for flocculating components of the black ink and has a permeation time of 5 seconds or less in plain paper (see, for example, Japanese Patent Application Laid-Open (JP-A) No. 2001-294788). This system is excellent in optical density, bleeding and intercolor bleeding when a pigment is used as a coloring material in the color ink, but there are cases where ejecting stability is not sufficient because the flocculating agent is contained. Electrolytes or polyvalent metal salts are usually used as the flocculating agent, and their too strong effect as the flocculating agent is also problematic.

For the purpose of improving ejecting characteristics etc., an ink comprising a nitrogen-containing heterocyclic 5-membered keto-acid such as pyrrolidone carboxylic acid or its salt has been proposed (see, for example, JP-A No. 63-265681, Japanese Patent No. 2711888, and JP-A No. 2000-109735). The object of this system is to improve ejecting properties by utilizing the moisture retention effect of a salt of the nitrogen-containing heterocyclic 5-membered keto-acid. However, the ink comprising the nitrogen-containing heterocyclic 5-membered keto-acid is poor in an effect of flocculating a coloring material and cannot achieve sufficient image qualities in some cases.

As described above, optical density, bleeding, intercolor bleeding, drying time and ejecting stability cannot be simultaneously satisfied by the conventional methods.

SUMMARY OF THE INVENTION

A first aspect of the invention provides a treatment liquid for ink jet comprising at least an organic acid having a pKa value of 4.5 or less, a nonionic substance, and water, wherein: (I) the treatment liquid has a pH value of 1.5 to 5.5, (II) the nonionic substance has a weight-average molecular weight of 300 or more but less than 5,000, and (III) a difference in solubility parameter (SP value) between a fundamental skeleton part of the organic acid excluding its acid group and the nonionic substance is 0.01 to 0.75.

A second aspect of the invention provides a treatment liquid for ink jet comprising at least an organic acid having a pKa value of 4.5 or less, a nonionic substance, and water, wherein: (I) the treatment liquid has a pH value of 1.5 to 5.5, (II) the nonionic substance has a weight-average molecular weight of 5,000 to 100,000, and (III) a difference in solubility parameter (SP value) between a fundamental skeleton part of the organic acid excluding its acid group and the nonionic substance is 0.01 to 2.

Figure 1:
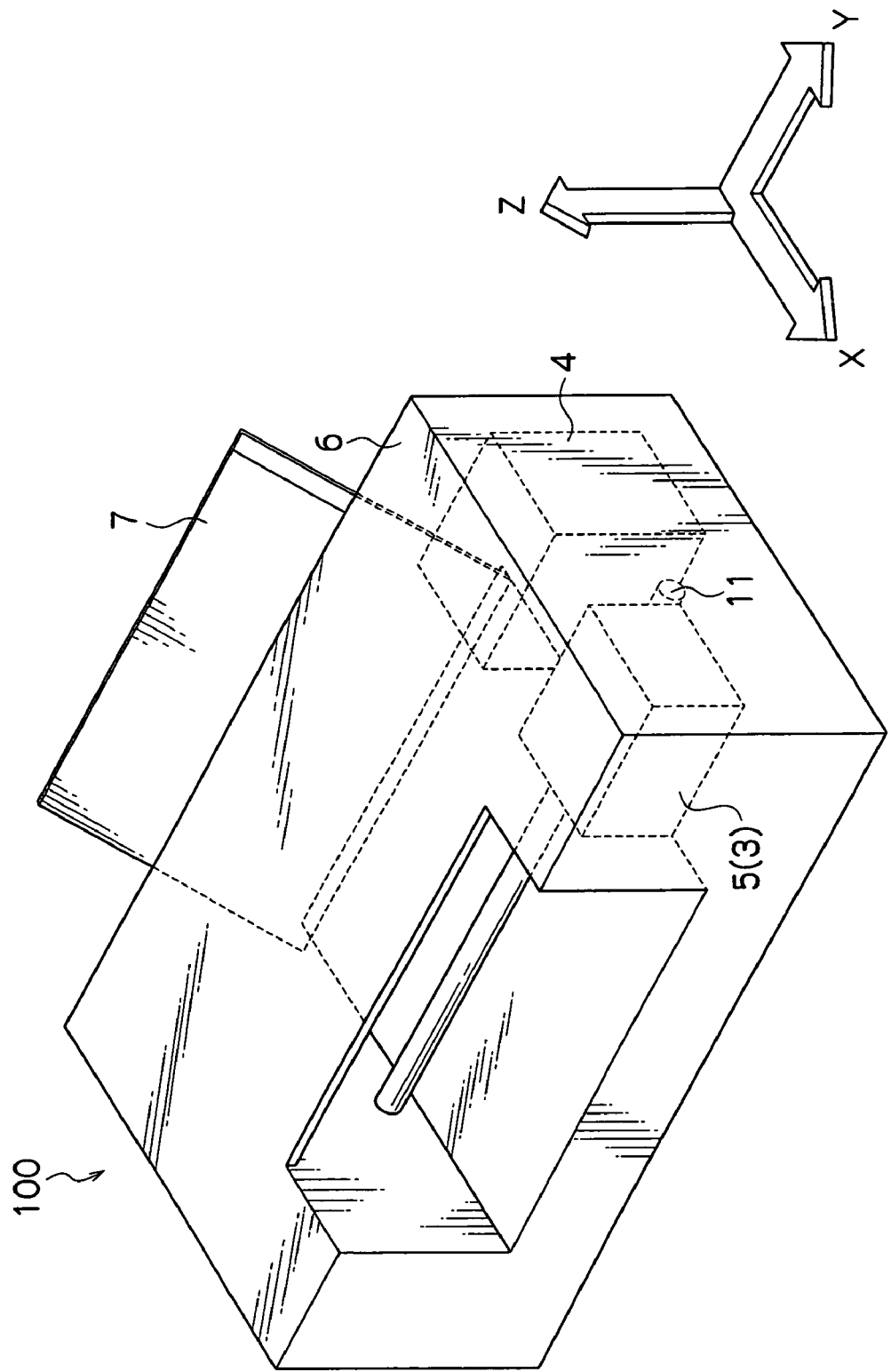
FIG. 1 is a perspective view showing the constitution of an outward appearance of one preferable embodiment of the ink jet recording apparatus of the invention.

DETAILED DESCRIPTION OF THE INVENTION (Treatment Liquid for Ink Jet, Ink Set for Ink Jet)

The treatment liquid for ink jet in the invention (referred to hereinafter as the treatment liquid) comprises at least an organic acid having a pKa value of 4.5 or less, a nonionic substance and water. When the weight-average molecular weight of the nonionic substance is 300 or more but less than 5,000, the pH value of the treatment liquid is 1.5 to 5.5, and the difference in solubility parameter (SP value) between a fundamental skeleton part of the organic acid excluding its acid group and the nonionic substance is 0.01 to 0.75 (the first invention). On one hand, when the weight-average molecular weight of the nonionic substance is 5,000 to 100,000, the pH value of the treatment liquid is 1.5 to 5.5, and the difference in solubility parameter (SP value) between a fundamental skeleton part of the organic acid excluding its acid group and the nonionic substance is 0.01 to 2.

The ink set for ink jet in the invention (referred to hereinafter as the ink set) comprises an ink and the treatment liquid of the invention.

Generally, the dissociation of an acid group in an organic acid is in an equilibrium state, and the dissociation state of an organic acid is changed depending on the degree of neutralization of the organic acid. An organic acid in a dissociated state is highly soluble in water, while an organic acid in an undissociated state is poor in solubility in water. Accordingly, when an organic acid having a pKa value of 4.5 or less is used in a lowly neutralized state, the ratio of the organic acid occurring in an undissociated state is increased due to relationship with the equilibrium state, to precipitate the undissociated organic acid in some cases. It has also been revealed that when the ink is stored for a long time, the water content of the treatment liquid is reduced at the top of a nozzle through evaporation of water in the treatment liquid, etc., thus accelerating precipitation of the organic acid in some cases.

Accordingly, the present inventors have paid attention to the solubility of the undissociated organic acid and have made extensive study, and as a result, they have found that ejecting stability is improved by satisfying the constitution of the invention. The mechanism therefor is not revealed, but is estimated as follows.

(A) A nonionic substance satisfying a specific relationship between the SP value of a fundamental skeleton part of an organic acid excluding its acid group and the SP value of the nonionic substance is highly compatible with the organic acid in an undissociated state, thus exhibiting an effect of dissolving the undissociated organic acid in water. As a result, ejecting stability after long-term storage is improved.

(B) A nonionic substance having a weight-average molecular weight in the range of the invention exhibits a higher viscosity-increasing effect relative to the amount of the nonionic substance added, thus achieving a reduction in the amount of the nonionic substance necessary for regulating viscosity in a specific range. This results in an increase in the water content of the ink to increase the total dissolution amount of the undissociated organic acid, thereby improving ejecting stability after long-term storage.

Thus, the treatment liquid of the invention can improve ejecting stability. The treatment liquid of the invention can be used in combination with an ink in an ink set to satisfy optical density, bleeding, intercolor bleeding, drying time and ejecting stability simultaneously.

The mechanism for improvement of image qualities along with ejecting stability is estimated as follows: When the treatment liquid to which an organic acid having a pKa value of 4.5 or less is added in a lowly neutralized state is mixed with an ink on a recording medium, a pigment in the ink is flocculated, and simultaneously separation of the pigment from the ink medium occurs. By the effect of flocculation of the pigment in the ink, only the flocculated pigment can be retained at high density on the surface of the recording medium, resulting in higher optical density and improvement in the bleeding. By the effect of separation of the pigment from the ink medium, on one hand, only the ink medium can permeate into the recording medium to realize high-speed drying.

Hereinafter, the ink is described in detail. The ink comprises at least a pigment, a water-soluble solvent, and water.

First, the pigment as a coloring material is described. As the pigment, both organic and inorganic pigments can be used, and as a black pigment, examples include carbon black pigments such as farness black, lamp black, acetylene black and channel black. Not only pigments of black and three primary colors (cyan, magenta and yellow), but also pigments of specific colors such as red, green, blue, brown and white and metallic glossy pigments of silver, gold etc. can be used. Further, the pigment may a pigment newly synthesized for the invention.

Specific examples of the pigment used in the present invention include Raven 7000, Raven 5750, Raven 5250, Raven 5000 Ultra II, Raven 3500, Raven 2000, Raven 1500, Raven 1250, Raven 1200, Raven 1190 ULTRA II, Raven 1170, Raven 1255, Raven 1080 and Raven 1060 (manufactured by Columbian Chemicals Company); Regal 400R, Regal 330R, Regal 660R, Mogul L, Black Pearls L, Monarch 700, Monarch 800, Monarch 880, Monarch 900, Monarch 1000, Monarch 1100, Monarch 1300 and Monarch 1400 (manufactured by Cabot Corporation); Color Black FW1, Color Black FW2, Color Black FW2V, Color Black 18, Color Black FW200, Color Black S150, Color Black S160, Color Black S170, Printex 35, Printex U, Printex V, Printex 140U, Printex 140V, Special Black 6, Special Black 5, Special Black 4A and Special Black 4 (manufactured by Degussa Co.); and No. 25, No. 33, No. 40, No. 47, No. 52, No. 900, No. 2300, MCF-88, MA 600, MA 7, MA 8 and MA 100 (manufactured by Mitsubishi Chemical Co., Ltd.). However, the pigments are not restricted thereto.

While examples of the cyan color include C.I. Pigment Blue-1, -2, -3, -15, -15:1, -15:2, -15:3, -15:4, -16, -22 and -60, the pigments are not restricted thereto.

While examples of the magenta color include C.I. Pigment Red-5, -7, -12, -48, -48:1, -57, -112, -122, -123, -146, -168, -184 and -202, the pigments are not restricted thereto.

While examples of the yellow color include C.I. Pigment Yellow-1, -2, -3, -12, -13, -14, -16, -17, -73, -74, -75, -83, 93, -95, -97, -98, -114, 128, -129, -138, -151, -154-155 and -180, the pigments are not restricted thereto.

As the pigment, a pigment self-dispersible in water can also be used. The self-dispersible pigment in water is the pigment having many water-solubilizing groups on the surface of the pigment that is able to be stably dispersed in water without adding any polymer dispersant. The self-dispersible pigment in water is practically obtained by applying surface modification treatments such as an acid or a base treatment, a coupling agent treatment, a polymer graft treatment, a plasma treatment or a redox treatment on so-called usual pigments.

In addition to the surface-modified pigments described above, commercially available pigments such as Cab-o-jet-200, Cab-o-jet-250, Cab-o-jet-260, Cab-o-jet-270, Cab-o-jet-300, IJX-444, IJX-55 (manufactured by Cabot Corporation), and Microjet Black CW-1 and CW-2 (manufactured by Orient Chemical Industries, Ltd.) may also be used as the self-dispersible pigment in water.

A pigment coated with a resin may be used as the pigment. This pigment is referred to as a microencapsulated pigment, and may be a commercial microencapsulated pigment available from Dainippon Ink and Chemicals, Inc., or Toyo Ink Manufacturing Co., Ltd., or a microencapsulated pigment developed for the invention.

The pigment is used in the range of 0.1% by mass to 50% by mass, preferably 1% by mass to 10% by mass, based on the total mass of the ink. When the amount of the pigment in the ink is less than 0.1% by mass, sufficient optical density may not be obtained, while when the amount of the pigment is higher than 50% by mass, the ejecting characteristics of the liquid may be made unstable.

Together with the pigment, a dispersant may be used to disperse the pigment. As the dispersant, a nonionic compound, an anionic compound, a cationic compound and an amphoteric compound can be used.

For example, copolymers of monomers having an α,β-ethylene unsaturated group can be taken. Examples of the monomer having the α,β-ethylene unsaturated group include acrylic acid, methacrylic acid, crotonic acid, itaconic acid, itaconic acid monoester, maleic acid, maleic acid monoester, fumaric acid, fumaric acid monoester, vinyl sulfonic acid, styrene sulfonic acid, vinyl naphthalene sulfonate, vinyl alcohol, acrylamide, methacryloxyethyl phosphate, bismethacryloxyethyl phosphate, methacryloxyethyl phenyl acid phosphate, ethylene glycol dimethacrylate, diethylene glycol dimethacrylate, a styrene derivative such as styrene, α-methylstyrene, vinyl toluene, vinyl cyclohexane, vinyl naphthalene, a vinyl naphthalene derivative, acrylic acid alkylester, phenyl acrylate, alkyl methacrylate, phenyl methacrylate, cycloalkyl methacrylate, alkyl crotonate, dialkyl itaconate, and dialkyl maleinate.

Copolymers obtained by copolymerization of the monomer(s) having the ethylenic α,β-unsaturated group can be used as the polymer dispersant. Specific examples thereof include styrene-styrene sulfonate copolymer, styrene-maleic acid copolymer, styrene-methacrylic acid copolymer, styrene-acrylic acid copolymer, vinylnaphthalene-maleic acid copolymer, vinylnaphthalene-methacrylic acid copolymer, vinylnaphthalene-acrylic acid copolymer, alkyl acrylate-acrylic acid copolymer, alkyl methacrylate-methacrylic acid copolymer, styrene-alkyl methacrylate-methacrylic acid copolymer, styrene-alkyl acrylate-acrylic acid copolymer, styrene-phenyl methacrylate-methacrylic acid copolymer, and styrene-cyclohexyl methacrylate-methacrylic acid copolymer.

It is preferable that the dispersant has a weight-average molecular weight of 2,000 to 50,000. In some cases in which the molecular weight of the dispersant is less than 2,000, the pigment is not dispersed stably. On the other hand, in some cases in which the molecular weight is more than 50,000, the viscosity of the ink is increased, so that the ejecting property is deteriorated. A more preferable weight-average molecular weight is 3,500 to 20,000.

The dispersant is preferably used in an amount of 1 to 100 parts by mass based on 100 parts by mass of the pigment. When the dispersant is used in an amount of more than 100 parts by mass, the ink viscosity may be increased to make the ejecting properties of the ink unstable. On the other hand, when the amount of the dispersant added is less than 1 part by mass, the dispersion stability of the pigment may be lowered. The amount of the dispersant added is more preferably 2.5 to 75 parts by mass, still more preferably 5 to 50 parts by mass based on 100 parts by mass of the pigment.

The volume-average particle diameter of the pigment is preferably 30 nm to 250 nm. The volume-average particle diameter of the pigment refers to the particle diameter of the pigment itself, or when an additive such as a dispersant adheres to the pigment, to the particle diameter of the pigment having the additive thereon. In the invention, Microtruck UPA particle-size analyzer 9340 (manufactured by Leeds & Northrup) is used as an instrument for measuring the volume-average particle diameter. This measurement is conducted in accordance of a predetermined measurement method after introducing 4 ml of ink into a measurement cell. As a parameter inputted at the time of measurement, ink viscosity is used for viscosity, and pigment density is used for the density of dispersed particles. The volume-average particle diameter is more preferably 60 nm to 250 nm, still more preferably 150 nm to 230 nm. When the volume-average particle diameter of the particles in the ink is less than 30 nm, optical density may be lowered, while when the particle diameter is greater than 250 nm, the dispersion stability of the pigment may not be secured.

Now, a water-soluble solvent is described. As a water-soluble solvent, water-soluble organic solvents such as polyhydric alcohols, a polyhydric alcohol derivative, a nitrogen-containing solvent, alcohols and a sulfur-containing solvent may be used. Specific examples of the polyhydric alcohols include ethylene glycol, diethylene glycol, propylene glycol, butylene glycol, triethylene glycol, 1,5-pentane diol, 1,2,6-hexane triol and glycerin. Specific examples of the polyhydric alcohol derivative include ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, dipropylene glycol monobutyl ether, and the ethylene oxide adduct of diglycerin. Specific examples of the nitrogen-containing solvent include pyrrolidone, N-methyl-2-pyrrolidone, cyclohexyl pyrrolidone, triethanol amine. Specific examples of the alcohols include ethanol, isopropyl alcohol, butyl alcohol, and benzyl alcohol. Specific examples of the sulfur-containing solvent include thiodiethanol, thiodiglycerol, sulfolane, and dimethyl sulfoxide. In addition, it is also possible to use propylene carbonate and ethylene carbonate.

The water-soluble solvents may be used alone or as a mixture of two or more thereof. The water-soluble solvent may be used in an amount of 1% by mass to 60% by mass, preferably 5% by mass to 40% by mass. When the amount of the water-soluble solvent in the ink is less than 1% by mass, sufficient optical density may not be attained, while when the amount of the water-soluble solvent is greater than 60% by mass, the ink viscosity may be increased to make ink ejecting properties unstable.

Now, water is described. Water is added in such a range as to attain surface tension and viscosity described later. The amount of water added is not particularly limited, but is preferably 10% by mass to 99% by mass, more preferably 30% by mass to 80% by mass, based on the total amount of the ink.

Now, other components of the ink are described. A surfactant having a structure with both a hydrophilic moiety and a hydrophobic moiety in the molecule can be suitably selected and used in the ink. The surfactant includes, but is not limited to, the following examples.

The surfactant includes a nonionic surfactant, an anionic surfactant, an amphoteric surfactant and a cationic surfactant, and the above-described dispersant can also be used.

The nonionic surfactant includes polyethylene glycol type and polyhydric alcohol type. The polyethylene glycol type nonionic surfactant includes higher alcohol/alkylene oxide adducts, alkyl phenol/alkylene oxide adducts, fatty acid/alkylene oxide adducts, polyhydric alcohol/fatty ester/alkylene oxide adducts, fatty acid amide/alkylene oxide adducts, polyalkylene glycol/alkylene oxide adducts, etc. On one hand, the polyhydric alcohol type nonionic surfactant includes glycerol fatty esters, polyhydric alcohol alkyl ethers, alkanol amine fatty acid amides, etc.

Specific examples of the nonionic surfactant include polypropylene glycol-ethylene oxide adducts, polyoxyethylene nonylphenyl ether, polyoxyethylene octylphenyl ether, polyoxyethylene dodecylphenyl ether, polyoxyethylene alkyl ethers, polyoxyethylene fatty acid esters, sorbitan fatty acid esters, polyoxyethylene sorbitan fatty acid esters, fatty acid alkylolamides, acetylene glycol, acetylene glycol-oxyethylene adducts, aliphatic alkanolamides, glycerin esters, and sorbitan esters.

The anionic surfactant includes carboxylates, sulfates, sulfonates and phosphates. Specifically, it is possible to use alkyl benzene sulfonate, alkyl phenyl sulfonate, alkyl naphthalene sulfonate, higher fatty acid salts, sulfates of higher fatty esters, sulfonates of higher fatty esters, sulfates and sulfonates of higher alcohol ethers, higher alkyl sulfosuccinates, higher alkyl phosphates, and phosphates of higher alcohol/ethylene oxide adducts, and for example, dialkyl sulfosuccinates, alkyl sulfonates, dodecyl benzene sulfonate, keryl (phonetic) benzene sulfonate, isopropyl naphthalene sulfonate, monobutyl phenyl phenol monosulfonate, monobutyl biphenyl sulfonate, monobutyl biphenyl sulfonate, and dibutyl phenyl phenol disulfonate can also be effectively used.

The amphoteric surfactant includes a carboxylic acid salt type such as an amino acid type and a betaine type, a sulfate type, a sulfonic acid type or a phosphate type. There are also amphoteric surfactants based on alanine, amide propyl betaine, sulfobetaine, amide amine oxide or imidazoline, and specifically alkyl betaine, sulfobetaine, sulfate betaine, imidazolidone betaine, amide propyl betaine, and aminodipropionate can be used.

Examples of the cationic surfactant include tetraalkylammonium salts, alkylammonium salts, benzalconium salts, alkylpyridium salts, and imidazolium salts. Specific examples thereof include dihydroxyethylstearylamine, 2-heptadecenyl-hydroxyethylimidazoline, lauryl dimethyl benzyl ammonium chloride, cetylpyridinium chloride, and stearamidemethylpyridium chloride.

Further, spiclisporic acid, and/or biosurfactants such as rhamnolipid and lysolecithin may also be used as the surfactant in the invention.

The surfactants may be used alone or as a mixture of two or more thereof. The amount of the surfactant added to the ink in the invention is preferably 5% by mass or less, more preferably 0.01 to 4% by mass, still more preferably 0.1 to 3% by mass, based on the total amount of the ink. When the amount of the surfactant added is 5% by mass or more, optical density and the storage stability of the ink may be deteriorated.

Now, preferable physical properties of the ink are described. The surface tension of the ink is preferably 20 mN/m to 60 mN/m, more preferably 20 mN/m to 45 mN/m, and is further preferably 20 mN/m to 35 mN/m. In some cases in which the surface tension is less than 20 mN/m, the ink overflows on a nozzle surface and printing cannot be carried out normally. On the other hand, in some cases in which the surface tension is more than 60 mN/m, the permeability is decreased so that drying time is prolonged.

The viscosity at 25° C. of the ink is preferably 1.2 mPa·s to 25.0 mPa·s, is more preferably equal to or more than 1.5 mPa·s but less than 10.0 mPa·s, and is further preferably equal to or more than 1.8 mPa·s but less than 5.0 mPa·s. In some cases in which the viscosity of the ink is more than 25.0 mPa·s, an ejecting property is deteriorated. On the other hand, in some cases in which the viscosity is less than 1.2 mPa·s, ejecting property is deteriorated.

Hereinafter, the treatment liquid is described. The treatment liquid comprises at least an organic acid having a pKa value of 4.5 or less, a nonionic substance and water.

At first, the organic acid is described. Examples of the organic acid having a pKa value of 4.5 or less include arginine acid, citric acid, glycine, glutamic acid, succinic acid, tartaric acid, cysteine, oxalic acid, fumaric acid, phthalic acid, maleic acid, malonic acid, lycine, malic acid, compounds expressed in the formula (1), and the derivatives of the compounds.

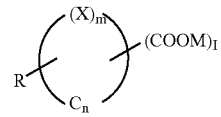

Formula (1)

In the formula, X represents O, CO, NH, $NR_1$, S or $SO_2$. $R_1$ represents an alkyl group, and $R_1$ is preferably $CH_3$, $C_2H_5$ or $C_2H_4OH$. R represents an alkyl group, and R is preferably $CH_3$, $C_2H_5$ or $C_2H_4OH$. R may be contained or not contained in the formula. X is preferably CO, NH, NR or O, more preferably CO, NH or O. M represents a hydrogen atom, an alkali metal or ammonium. M is preferably H, Li, Na, K, monoethanol ammonium, diethanol ammonium or triethanol ammonium, more preferably H, Na or K, still more preferably a hydrogen atom. n represents an integer of 3 to 7. n is preferably such an integer that the ring becomes a 6- or 5-memberred ring, more preferably such an integer that the ring becomes a 5-memberred ring. m is 1 or 2. The compound represented by the formula (1) may be a saturated or unsaturated ring. 1 is an integer of 1 to 5.

Specific examples of the compound expressed in the formula (1) include compounds having furan-, pyrrole-, pyrroline-, pyrrolidone-, pyrone-, pyrrole-, thiophene-, indole-, pyridine-, or quinoline-structure, and further having a carboxyl group as a functional group. Specific examples of the compound include 2-pyrrolidone-5-carboxylic acid, 4-methyl-4-pentanolide-3-carboxylic acid, furan carboxylic acid, 2-benzofuran carboxylic acid, 5-methyl-2-furan carboxylic acid, 2,5-dimethyl-3-furan carboxylic acid, 2,5-furan dicarboxylic acid, 4-butanolide-3-carboxylic acid, 3-hydroxy-4-pyrone-2,6-dicarboxylic acid, 2-pyrone-6-carboxylic acid, 4-pyrone-2-carboxylic acid, 5-hydroxy-4-pyrone-5-carboxylic acid, 4-pyrone-2,6-dicarboxylic acid, 3-hydroxy-4-pyrone-2,6-dicarboxylic acid, thiophene carboxylic acid, 2-pyrrole carboxylic acid, 2,3-dimethylpyrrole-4-carboxylic acid, 2,4,5-trimethylpyrrole-3-propionic acid, 3-hydroxy-2-indole carboxylic acid, 2,5-dioxo-4-methyl-3-pyrroline-3-propionic acid, 2-pyrrolidine carboxylic acid, 4-hydroxyproline, 1-methylpyrrolidine-2-carboxylic acid, 5-carboxy-1-methyl pyrrolidine-2-acetic acid, 2-pyridine carboxylic acid, 3-pyridine carboxylic acid, 4-pyridine carboxylic acid, pyridine dicarboxylic acid, pyridine tricarboxylic acid, pyridine pentacarboxylic acid, 1,2,5,6-tetrahydro-1-methyl nicotinic acid, 2-quinoline carboxylic acid, 4-quinoline carboxylic acid, 2-phenyl-4-quinoline carboxylic acid, 4-hydroxy-2-quinoline carboxylic acid, and 6-methoxy-4-quinoline carboxylic acid.

Preferably, the organic acid having a pKa value of 4.5 or less includes citric acid, glycine, glutamic acid, succinic acid, tartaric acid, phthalic acid, pyrrolidone carboxylic acid, pyrone carboxylic acid, pyrrole carboxylic acid, furan carboxylic acid, pyridine carboxylic acid, coumalic acid, thiophene carboxylic acid, nicotinic acid, derivatives thereof, and salts thereof. More preferably, the organic acid includes pyrrolidone carboxylic acid, pyrone carboxylic acid, pyrrole carboxylic acid, furan carboxylic acid, pyridine carboxylic acid, coumalic acid, thiophene carboxylic acid, nicotinic acid, derivatives thereof, and salts thereof. Further preferably, the organic acid includes pyrrolidone carboxylic acid, pyrone carboxylic acid, furan carboxylic acid, coumalic acid, derivatives thereof, and salts thereof.

As the organic acid having a pKa value of 4.5 or less, the above-described compounds may be used alone or as a mixture of two or more thereof. The organic acid having a pKa value of 4.5 or less is used in an amount of 0.01 to 15% by mass, preferably 0.1 to 10% by mass, based on the total amount of the treatment liquid. When the amount of the organic acid having a pKa value of 4.5 or less added to the treatment liquid is less than 0.01% by mass, the flocculation of a pigment upon contacting with ink is insufficient, and optical density, bleeding, intercolor bleeding may not be improved, while when the amount of the organic acid is higher than 15% by mass, ejecting properties after long-term storage may be deteriorated.

Then, the nonionic substance is described. The nonionic substance includes polyolefins, polyethers, polyesters, polyurethane, and polysilyl ethers. Specifically, it is possible to use polyesters, polyvinyl pyrrolidone, polyvinyl alcohol, polyvinyl acetate, starch, higher alcohol/alkylene oxide adducts, alkyl phenol/alkylene oxide adducts, fatty acid/alkylene oxide adducts, polyhydric alcohol/fatty ester/alkylene oxide adducts, fatty acid amide/alkylene oxide adducts, polyalkylene glycol/alkylene oxide adducts, glycerol fatty esters, and polyhydric alcohol alkyl ethers.

Among these, the nonionic substance is preferably polyvinyl pyrrolidone, higher alcohol/alkylene oxide adducts, alkyl phenol/alkylene oxide adducts, fatty acid/alkylene oxide adducts, polyhydric alcohol/fatty ester/alkylene oxide adducts, fatty acid amide/alkylene oxide adducts or polyhydric alcohol alkyl ethers because the viscosity of the treatment liquid can be suppressed to a low level.

When the weight-average molecular weight of the nonionic substance is 300 or more but less than 5,000 (preferably 500 to 4,000), the difference in SP value between a fundamental skeleton part of the organic acid excluding its acid group and the nonionic substance needs to be 0.01 to 0.75 (preferably 0.01 to 0.6). On one hand, when the weight-average molecular weight of the nonionic substance is 5,000 to 100,000 (preferably 5,000 to 7,500), the difference in SP value between a fundamental skeleton part of the organic acid excluding its acid group and the nonionic substance needs to be 0.01 to 2. The difference in SP value means an absolute value of this difference.

More preferably, the difference in SP value between a fundamental skeleton part of the organic acid excluding its acid group and the nonionic substance is 0.01 to 0.6 and simultaneously the weight-average molecular weight of the nonionic substance is 500 or more but less than 90,000, and most preferably, the difference in SP value between a fundamental skeleton part of the organic acid excluding its acid group and the nonionic substance is 0.01 to 0.6 and simultaneously the weight-average molecular weight of the nonionic substance is 4,000 to 50,000.

When the difference in SP value is less than 0.01, the optical density and bleeding are deteriorated. When the weight-average molecular weight of the nonionic substance is higher than 100,000, ejecting characteristics are deteriorated, while when the weight-average molecular weight is less than 300, the organic acid is precipitated during storage for a long time, failing to secure storage stability. The organic acid is also precipitated during storage for a long time, failing to secure storage stability in the case where even if the weight-average molecular weight of the nonionic substance is 300 or more but less than 5,000, the difference in SP value is greater than 0.75, or in the case where even if the weight-average molecular weight of the nonionic substance is 5,000 or more but less than 100,000, the difference in SP value is greater than 2.

The solubility parameter (SP value) in the invention is an SP value of Fedors, which is calculated according to the following equation:

Equation $$SP = \sqrt{\frac{\Delta E}{V}} = \sqrt{\frac{\sum_i \Delta ei}{\sum_i \Delta vi}}$$

Unit $$\sqrt{cal/cm^3} \ (= 0.489 \times \sqrt{J/cm^3})$$

In the equation, $\Delta E$ represents cohesive energy density, V represents molar volume, $\Delta ei$ represents the evaporation energy of an atom or an atomic group, and $\Delta vi$ represents molar volume. The SP value of a fundamental skeleton part of the organic acid excluding its acid group refers to an SP value calculated from a structure of the organic acid wherein the acid group moiety is replaced by a hydrogen atom.

The amount of the nonionic substance added is preferably 1.5 to 15% by mass based on the total mass of the treatment liquid. The amount of the nonionic substance added is more preferably 3.0 to 12% by mass, sill more preferably 3.5 to 10% by mass. When the amount of the nonionic added is less than 1.5% by mass, ejecting stability may be deteriorated after long-term storage, while when the amount is higher than 15% by mass, initial ejecting properties may be lowered.

Now, water is described. Water is added in such a range as to attain surface tension and viscosity described later. The amount of water added is not particularly limited, but is preferably 10% by mass to 99% by mass, more preferably 30% by mass to 80% by mass, based on the total amount of the treatment liquid.

Now, other components of the treatment liquid are described. The same water-soluble solvent as in the ink can be used in the treatment liquid. The water-soluble solvent may be used in an amount of 1% by mass to 60% by mass, preferably 5% by mass to 40% by mass. When the amount of the water-soluble solvent in the liquid is less than 1% by mass, sufficient optical density may not be obtained, while when the amount is greater than 60% by mass, the viscosity of the liquid may be increased to make initial ejecting properties unstable.

The same surfactant as in the ink can be used in the treatment liquid. The amount of the surfactant added is preferably less than 10% by mass, more preferably in the range of 0.01 to 5% by mass, still more preferably 0.01 to 3% by mass, based on the total mass of the treatment liquid. When the amount of the surfactant added is 10% by mass or more, optical density and storage stability may be deteriorated.

A coloring material can also be contained in the treatment liquid. The coloring material contained in the treatment liquid is preferably a dye, a pigment having sulfonic acid or sulfonate on the surface thereof or a self-dispersible pigment. This is because these coloring materials are considered to hardly flocculate even in the coexistence of a flocculating agent. By using such coloring material, the storage stability of the treatment liquid does not deteriorate. The dye, the pigment having sulfonic acid or sulfonate on the surface thereof and the self-dispersible pigment used may be those described as the pigment in the ink.

When the pigment is used in the treatment liquid, the volume-average particle diameter of the pigment particles is preferably 30 nm to 250 nm, more preferably 50 nm to 200 nm, further more preferably 75 nm to 175 nm. When the volume-average particle diameter of the pigment particles in the liquid is less than 30 nm, optical density may be lowered, while when the particle diameter is greater than 250 nm, the dispersion stability of the pigment may not be secured.

Now, the physical properties of the treatment liquid are described. The pH value of the treatment liquid needs to be 1.5 to 5.5, and is preferably 1.5 to 4.5, more preferably 2.5 to 4.5. When the pH is less than 1.5, ejecting properties after long-term storage are deteriorated. This is possibly because the organic acid is precipitated at the top of a nozzle, owing to a low solubility of the organic acid, or a head member is deteriorated. On one hand, when the pH is higher than 5.5, optical density may be lowered or bleeding may occur. This is estimated due to insufficient flocculation of the ink upon mixing with the treatment liquid.

The pH is measured in a general environment (23±0.5° C., 55±5% RH) by using an instrument pH/Conductivity Meter MPC227 (manufactured by Mettler Toledo).

The surface tension of the treatment liquid is preferably 20 mN/m to 45 mN/m, more preferably 20 mN/m to 39 mN/m, still more preferably 20 mN/m to 35 mN/m. When the surface tension is lower than 20 mN/m, the liquid may overflow on the surface of a nozzle, thus failing to effect normal printing. On the other hand, when the surface tension is higher than 45 mN/m, permeability is deteriorated to prolong the drying time.

The viscosity of the treatment liquid is preferably 1.2 mPa·s to 25.0 mPa·s, more preferably 1.5 mPa·s or more but less than 10.0 mPa·s, still more preferably 1.8 mPa·s or more but less than 5.0 mPa·s. When the viscosity of the treatment liquid is higher than 25.0 mPa·s, initial ejecting properties may be deteriorated. On the other hand, when the viscosity is lower than 1.2 mPa·s, ejecting properties after long-term storage may be deteriorated.

The treatment liquid for ink jet according to the invention preferably comprises an organic acid having a cyclic structure, an organic compound having a cyclic structure, a water-soluble solvent, and water. The organic compound having a cyclic structure refers to a compound not containing, in its structure, a component serving as an acid. That is, the organic acid having a cyclic structure and the organic compound having a cyclic structure are compounds different from each other.

Preferably, the organic acid having a cyclic structure is represented by the following formula (2), and the organic compound having a cyclic structure is represented by the following formula (3).

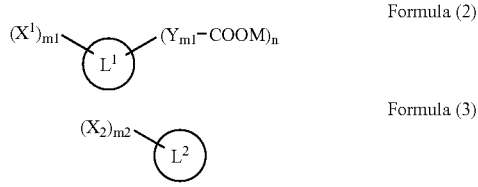

Formula (2)

Formula (3)

In the formula (2), $X^1$ represents an optionally substituted hydrocarbon group, an alkyloxy group, —OH, —$NH_2$, —$NR^1_2$, —$COOR^1$ or —$SO_3H$. $R^1$ represents an alkyl group. Y represents an optionally substituted hydrocarbon group, one or more constituent carbon atoms of which may be substituted with an atom or an atomic group. M represents a hydrogen atom, an alkali metal or ammonium. m1 is an integer of 0 to 3. n represents an integer of 1 to 4. The cyclic structure $L^1$ represents a saturated or unsaturated cyclic structure, one or more constituent carbon atoms of which may be substituted with an O, N or S atom or a CO, NH or $NR^3$ atomic group. $R^3$ represents an alkyl group, an alkenyl group, an alkenylidene group, or an alkylene group. In the formula (3), $X^2$ represents an optionally substituted hydrocarbon group, an alkyloxy group, —OH, —$NH_2$, —$NR^2_2$, or —$COOR^2$. $R^2$ represents an alkyl group. m2 is an integer of 0 to 3. The cyclic structure $L^2$ represents a saturated or unsaturated cyclic structure, one or more constituent carbon atoms of which may be substituted with an O, N or S atom or a CO, NH or $NR^4$ atomic group. $R^4$ represents an alkyl group, an alkenyl group, an alkenylidene group, or an alkylene group.

In the formula (2), the optionally substituted hydrocarbon group represented by $X^1$ is a group preferably having 1 to 8 carbon atoms in total, more preferably 1 to 6 carbon atoms, and specific examples include a methyl group, ethyl group, propyl group, butyl group, pentyl group, hexyl group and cyclohexyl group, among which a methyl group and ethyl group are preferable.

In the formula (2), the alkyloxy group represented by $X^1$ is a group preferably having 1 to 8 carbon atoms in total, more preferably 1 to 6 carbon atoms, and specific examples include a methoxy group, ethoxy group, propoxy group, butoxy group, isopropoxy group, isobutoxy group, sec-butoxy group, tert-butoxy group, pentoxy group and phenoxy group, among which a methoxy group, ethoxy group and propoxy group are preferable.

In the formula (2), the alkyl group represented by $R^1$ is a group preferably having 1 to 4 carbon atoms in total, more preferably 1 to 3 carbon atoms, and specific examples include a methyl group, ethyl group, propyl group and butyl group, among which a methyl group, ethyl group and propyl group are preferable.

In the formula (2), the optionally substituted hydrocarbon group represented by Y is a group preferably having 1 to 4 carbon atoms in total, more preferably 1 to 3 carbon atoms, and specific examples include a methyl group, ethyl group, propyl group and butyl group, among which a methyl group, ethyl group and propyl group are preferable.

The optionally substituted hydrocarbon group represented by Y is a group, one or more constituent carbon atoms of which may be substituted with another atom or an atomic group. Another atom or another atomic group includes oxygen, sulfur etc.

In the formula (2), the alkali metal represented by M includes sodium, potassium, lithium etc., among which sodium and lithium are preferable.

In the formula (2), the ammonium represented by M includes monoethanol ammonium, diethanol ammonium, triethanol ammonium etc., among which diethanol ammonium and triethanol ammonium are preferable.

In the formula (2), the cyclic structure $L^1$ not particularly limited insofar as it is a saturated or unsaturated cyclic structure, but the number of carbon atoms in total is preferably 3 to 10, more preferably 3 to 6, still more preferably 4 to 5, and specific examples include cyclopropane, cyclobutane, cyclopentane, cylopentene, cyclohexane, cyclohexene, benzene, indene, naphthalene, azulene, fluorene, phenanthrene, anthracene etc., among which cyclobutane, cyclopentane and cyclopentene are preferable.

In the cyclic structure $L^1$, one or more constituent carbon atoms may be substituted with an O, N or S atom or a CO, NH or $NR^3$ atomic group. $R^3$ represents an alkyl group (for example, a methyl group, ethyl group, propyl group etc.), an alkenyl group (for example, a vinyl group, propenyl group, allyl group etc.), an alkenylidene group (for example, a methylene group, ethylidene group etc.) and an alkylene group (for example, a methylene group, ethylene group, trimethylene group etc.).

In the formula (2), m1 is preferably an integer of 1 to 3. On one hand, n is preferably an integer of 1 to 3. Two m1s may be values different from each other.

In the formula (3), $X^2$ and m2 have the same meanings as those of $X^1$ and m1 in the formula (2) except that $X^2$ does not contain an acid group, and preferable examples thereof are also the same as described therein ($R^1$ and $R^2$ have the same meaning and preferable examples thereof are also the same). The cyclic structure $L^2$ in the formula (3) has the same meaning as that of the cyclic structure $L^1$ in the formula (2), and preferable examples thereof are also the same as described therein ($R^3$ and $R^4$ have the same meaning and preferable examples thereof are also the same).

The organic acid having a cyclic structure represented by the formula (2) may be an organic acid wherein out of carbon atoms constituting the cyclic structure $L^1$ in the formula (2), at least one carbon atom is substituted with CO, and at least one carbon atom is substituted with NH.

The organic compound having a cyclic structure represented by the formula (3) may be a polymer compound in which the cyclic structure represented by the formula (3) is a repeating unit of the polymer compound and at least one $X^2$ or at least one atomic group constituting the cyclic structure $L^2$ forms a main chain of the polymer compound. In this case, the weight-average molecular weight is preferably 5000 to 50000, more preferably 5000 to 30000.

The organic compound having a cyclic structure represented by the formula (3) may be a polymer compound in which the cyclic structure represented by the formula (3) is a repeating unit of the polymer compound and $R^4$ forms a main chain of the polymer compound wherein out of carbon atoms constituting the cyclic structure $L^2$, at least one carbon atom is substituted with CO and at least one carbon atom is substituted with $NR^4$. In this case, the weight-average molecular weight is preferably 5000 to 50000, more preferably 5000 to 15000.

In the invention, preferably, the organic acid having a cyclic structure represented by the formula (2) is an organic acid wherein out of carbon atoms constituting the cyclic structure $L^1$, at least one carbon atom is substituted with CO and at least one carbon atom is substituted with NH, and the organic compound having a cyclic structure represented by the formula (3) is a polymer compound in which the cyclic structure represented by the formula (3) is a repeating unit of the polymer compound and $R^4$ forms a main chain of the polymer compound wherein out of carbon atoms constituting the cyclic structure $L^2$, at least one carbon atom is substituted with CO and at least one carbon atom is substituted with $NR^4$.

Examples of the organic acid having a cyclic structure represented by the formula (2) include 2-pyrrolidone-5-carboxylic acid, 4-methyl-4-pentanolide-3-carboxylic acid, furan carboxylic acid, 2-benzofuran carboxylic acid, 5-methyl-2-furan carboxylic acid, 2,5-dimethyl-3-furan carboxylic acid, 2,5-furan dicarboxylic acid, 4-butanolide-3-carboxylic acid, 3-hydroxy-4-pyrone-2,6-dicarboxylic acid, 2-pyrone-6-carboxylic acid, 4-pyrone-2-carboxylic acid, 5-hydroxy-4-pyrone-5-carboxylic acid, 4-pyrone-2,6-dicarboxylic acid, 3-hydroxy-4-pyrone-2,6-dicarboxylic acid, thiophene carboxylic acid, 2-pyrrole carboxylic acid, 2,3-dimethylpyrrole-4-carboxylic acid, 2,4,5-trimethylpyrrole-3-propionic acid, 3-hydroxy-2-indole carboxylic acid, 2,5-dioxo-4-methyl-3-pyrroline-3-propionic acid, 2-pyrrolidine carboxylic acid, 4-hydroxy proline, 1-methylpyrrolidine-2-carboxylic acid, 5-carboxy-1-methylpyrrolidine-2-acetic acid, 2-pyridine carboxylic acid, 3-pyridine carboxylic acid, 4-pyridine carboxylic acid, pyridine dicarboxylic acid, pyridine tricarboxylic acid, pyridine pentacarboxylic acid, 1,2,5,6-tetrahydro-1-methyl nicotinic acid, 2-quinoline carboxylic acid, 4-quinoline carboxylic acid, 2-phenyl-4-quinoline carboxylic acid, 4-hydroxy-2-quinoline carboxylic acid, 6-methoxy-4-quinoline carboxylic acid, 4-piperidine carboxylic acid and 2-piperidine carboxylic acid, among which 2-pyrrolidone-5-carboxylic acid, furan carboxylic acid, 2-pyrrolidine carboxylic acid, 3-pyridine carboxylic acid and 4-piperidine carboxylic acid are preferable from the viewpoint of low price and easy handling.

Examples of the organic compound having a cyclic structure represented by the formula (3) include tetrahydrofuran (freely mixed), tetrahydropyran (dissolved), furan (solubility of 1% by mass at 25° C.), dioxane (freely mixed), trioxane (dissolved), 2-pyrrolidone (dissolved), NMP (freely compatible), ε-caprolactam (solubility of 84% by mass at 25° C.), cyclohexanone (solubility of 15% by mass at 110° C.), pyrrole (solubility of 8% by mass at 25° C.), piperidine (freely mixed), pyridine (freely mixed), furfuryl alcohol (infinite), tetrahydrofurfuryl alcohol (infinite), furfural (solubility of 8.3% by mass at 20° C.), morpholine (completely compatible), N-ethyl morpholine (freely mixed), ethylene carbonate (freely dissolved), propylene carbonate (dissolved), 1,3-propane sultone (readily dissolved) and polyvinyl pyrrolidone (soluble), among which tetrahydropyran, NMP, ε-caprolactam, tetrahydrofurfuryl alcohol, morpholine, ethylene carbonate, and propylene carbonate are preferable in respect of low price or easy handling. In the brackets, solubility in water is shown.

The combination of the organic acid having a cyclic structure represented by the formula (2) and the organic compound having a cyclic structure represented by the formula (3) is preferably a combination of 2-pyrrolidone-5-carboxylic acid and 2-pyrrolidone, 2-pyrrolidone-5-carboxylic acid and NMP, 2-pyrrolidone-5-carboxylic acid and ε-caprolactam, or furan carboxylic acid and furan.

In the invention, the content of the organic acid having a cyclic structure is preferably 1 to 20% by mass, more preferably 1 to 15% by mass, still more preferably 1 to 10% by mass. When the content of the organic acid having a cyclic structure is less than 1% by mass, the working efficiency thereof with inks may be lowered, while when the content is greater than 20% by mass, solubility is insufficient to cause poor ejection because of a problem of precipitation.

A value obtained by dividing the content of the organic compound having a cyclic structure by the content of the organic acid having a cyclic structure (that is, organic compound (% by mass)/organic acid (% by mass)) is preferably 0.2 to 2.0, more preferably 0.3 to 1.5, still more preferably 0.5 to 1.0. When the (organic compound (% by mass)/organic acid (% by mass)) is less than 0.2, solubility is insufficient to cause poor ejection because of a problem of precipitation, while when the (organic compound (% by mass)/organic acid (% by mass)) is higher than 2.0, the viscosity of the treatment liquid is increased to cause insufficient ejection in some cases.

The number of particles having a coarseness of 5 μm or more in a mixture of the ink and the treatment liquid is preferably 1,000 to 5,000,000 per μL, more preferably 2,500 to 1,000,000 per μL, still more preferably 5,000 to 500,000 per μL. When the number of particles having a coarseness of 5 μm or more in a mixture of the ink for ink jet and the treatment liquid is less than 1,000 per μL, optical density may be lowered. On the other hand, it has been revealed that when the number of particles having a coarseness of 5 μm or more is greater than 5,000,000 per μL, the cohesive force is so strong that the ink is prevented from spreading, thus generating white stripes etc., and optical density may be lowered.

The number of particles having a coarseness of 5 μm or more in a mixture of the ink and the treatment liquid is determined by mixing the ink with the treatment liquid in a ratio of 1/1 by mass, then collecting 2 μL of the resulting mixture under stirring, and measuring it with Accusizer TM770 Optical Particle Sizer (manufactured by Particle Sizing Systems). As a parameter at the time of measurement, the density of the pigment is inputted for the density of the dispersed particles. The density of the pigment can be determined by heating and drying the pigment dispersion liquid and measuring the resulting powder with a specific gravity hydrometer or a specific gravity bottle.

Other additives for the ink and the treatment liquid, such as polyethylenimine, polyamines, polyvinyl pyrrolidone, polyethyleneglycol, cellulose derivatives including ethyl cellulose and carboxymethyl cellulose, polysaccharides and their derivatives, as well as water soluble polymers, polymer emulsions including acrylic polymer emulsions, polyurethane polymer emulsions and hydrophilic latex, hydrophilic polymer gel, cyclodextrin, macrocyclic amines, dendrimers, crown ethers, urea and derivatives thereof, acetamide, silicone-containing surfactants and fluorine-containing surfactants, may be used for controlling characteristics such as improvement of ejectability. Alkali metal compounds such as potassium hydroxide, sodium hydroxide and lithium hydroxide; nitrogen-containing compounds such as ammonium hydroxide, triethanolamine, diethanolamine, ethanolamine and 2-amino-2-methyl-1-propanol; alkali earth metal compounds such as calcium hydroxide; acids such as sulfuric acid, hydrochloric acid and nitric acid; and salts between strong acids and alkalescents such as ammonium sulfate may be used for controlling the pH and conductivity.

Additives such as a pH buffer, an antioxidant, a fungicide, a viscosity control agent, a conductive agent and a UV absorber may be also added, if necessary.

(Ink Tank for Ink Jet)

The ink tank for ink jet (including a treatment liquid tank) in the invention accommodates the treatment liquid of the invention or each liquid in the ink set for ink jet in the invention, and for example an ink tank described in JP-A No. 2001-138541 can be applied. In this case, the ink tank is charged with the ink and when the ink is ejected through a recording head, a change in ink properties during storage for a long time is suppressed, and the ink is sufficiently satisfactory in respect of ejecting properties through a recording head particularly during long-term storage.

(Ink Jet Recording Method and Ink Jet Recording Apparatus)

An ink jet recording method of the invention is a method of carrying out printing so as to cause an ink for ink jet and a treatment liquid for ink jet to come in contact with each other using the ink set for ink jet according to the invention. Moreover, an ink jet recording apparatus according to the invention comprises recording heads for ejecting, to a recording medium, liquids of the ink set for ink jet according to the invention. These can apply a recording apparatus provided with a heater for controlling the drying of an ink or a recording apparatus provided with an intermediate transfer mechanism and serving to print a recording material on an intermediate member and then carrying out a transfer onto a recording medium such as a paper in addition to an ordinary ink jet recording apparatus.

In the ink jet recording method (apparatus) of the invention, the mass per drop of each the ink for ink jet and the treatment liquid is preferably 0.01 ng to 25 ng, more preferably 0.5 ng to 20 ng, still more preferably 0.5 ng to 8 ng. When the mass of the liquid per drop is higher than 25 ng, bleeding may be deteriorated. This is presumably because the contact angle of the ink and the treatment liquid to a recording medium varies depending on the amount of one drop, and it is estimated that as the amount of one drop is increased, the liquid tends to spread easily in the direction of the surface of a paper. When the mass of the liquid per drop is less than 0.01 ng, ejecting stability is deteriorated in some cases.

In an ink jet apparatus enabling ejecting of a plurality of volumes per drop through one nozzle, the amount of one drop refers to the amount of the minimum drop capable of printing.

The ink for ink jet and the treatment liquid are applied onto a recording medium such that they are in contact with each other, and the ink for ink jet is contacted with the treatment liquid, whereby the ink is flocculated by the action of a flocculating agent to realize a recording method excellent in coloration, unevenness of a solid part, optical density, bleeding, intercolor bleeding and drying time. Insofar as they are in contact with each other, they may be applied so as to be adjacent to each other or applied so as to be overlaid with each other.

With respect to the order of application onto a recording medium, the treatment liquid is first applied onto the recording medium, and then the ink for ink jet is applied. This is because the constituent components of the ink for ink jet can be effectively flocculated by applying the treatment liquid first. After the treatment liquid is applied, the ink for ink jet can be applied at any time. The ink is applied preferably at 0.5 second or less after the treatment liquid is applied.

In the ink jet recording method (apparatus) according to the invention, it is preferable that a mass ratio of the amount of the applied ink to the amount of the applied treatment liquid, each of which is used for forming one pixel, should be from 1:20 to 20:1. The mass ratio is more preferably from 1:10 to 10:1 and is further preferably from 1:5 to 5:1. In some cases in which the amount of application of the ink is much smaller or larger than the amount of application of the treatment liquid, the flocculation becomes insufficient so that the optical density is reduced, the bleeding is caused more seriously and the intercolor bleeding is deteriorated. The pixel implies a lattice point constituted when a picture image is divided in horizontal and vertical scanning directions at a minimum distance where the ink can be applied. By giving a proper ink set to each pixel, a color and an image density can be regulated and an image is thus formed.

It is preferable that the ink jet recording method (apparatus) according to the invention should employ a thermal ink jet recording system or a piezo ink jet recording system in respect of an effect of improving bleeding and intercolor bleeding. The cause is not apparent. Although an ink is heated during an ejection so that viscosity is reduced in case of the thermal ink jet recording system, the temperature of the ink is dropped on a recording medium so that the viscosity is suddenly increased. Therefore, it can be supposed that there is an effect of improving bleeding and intercolor bleeding. On the other hand, in case of the piezo ink jet system, a liquid having a high viscosity can be ejected. It is possible to suppress the spread of the liquid having a high viscosity on the recording medium in the direction of the surface of the paper. Consequently, it is guessed that there is an effect of improving the bleeding and the intercolor bleeding.

In the ink jet recording method (apparatus) of the invention, the ink and the treatment liquid are supplied into a recording head preferably from ink tanks (including a treatment liquid tank) charged with the ink and the treatment liquid, respectively. The ink tank is preferably in a cartridge system detachable from the apparatus, and by exchanging the ink tank in a cartridge system with a new one, the ink and the treatment liquid can be easily supplied.

Hereinafter, a preferable embodiment of the ink jet recording apparatus of the invention is described in detail by reference to the Drawings. In the Drawings, members having substantially the same function are given the same symbol, and their overlapping description is omitted.

Figure 2:
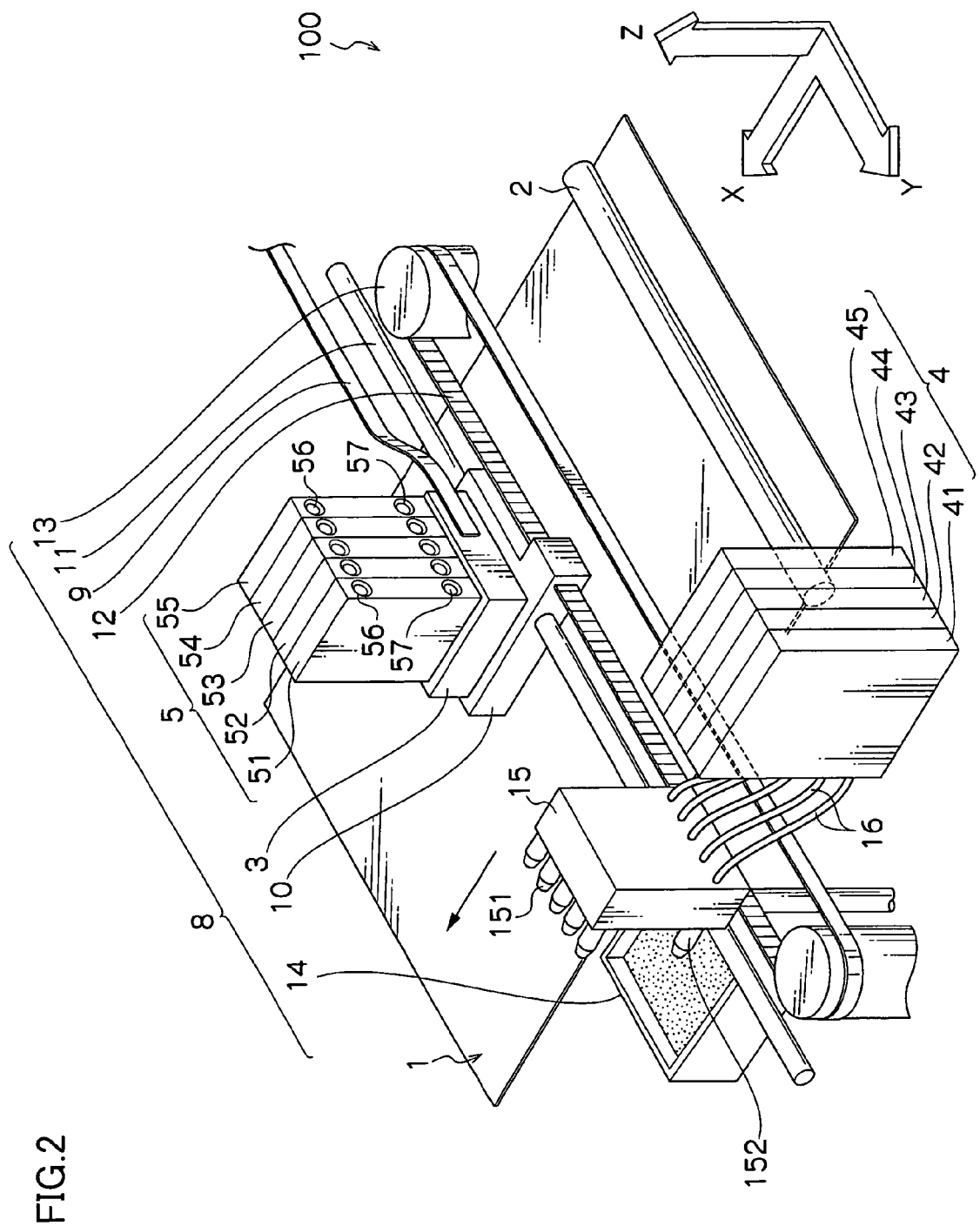
FIG. 2 is a perspective view showing a fundamental constitution in the inside of the ink jet recording apparatus in FIG. 1.

FIG. 1 is a perspective view showing the constitution of an outward appearance of one preferable embodiment of the ink jet recording apparatus of the invention. FIG. 2 is a perspective view showing a fundamental constitution in the inside of the ink jet recording apparatus in FIG. 1 (referred to hereinafter as the image forming apparatus).

The image forming apparatus 100 in this embodiment is constituted so as to be actuated by the ink jet recording method of the invention, to form an image. That is, as shown in FIGS. 1 and 2, the image forming apparatus 100 is composed essentially of an external cover 6, a tray 7 capable of carrying a predetermined amount of recording medium 1 such as paper, a delivery roller (delivery means) 2 for delivering each sheet of recording medium 1 into the image forming apparatus 100, an image forming part 8 (image forming means) for forming an image by ejecting the ink and the treatment liquid onto the surface of the recording medium 1, and a main ink tank 4 supplying the ink and the treatment liquid into each subsidiary ink tank 5 in the image forming part 8.

The delivery roller 2 is a paper feeding mechanism composed of a pair of rollers arranged to be rotatable in the image forming apparatus 100, holds the recording medium 1 set on tray 7, and delivers each sheet of a predetermined amount of recording medium 1 at predetermined timing into the apparatus 100.

The image forming part 8 forms an image with the ink on the surface of the recording medium 1. The image forming part 8 is composed essentially of a recording head 3, a subsidiary ink tank 5, a feed signal cable 9, a carriage 10, a guide rod 11, a timing belt 12, a driving pulley 13, and a maintenance unit 14.

The subsidiary ink tank 5 has subsidiary ink tanks 51, 52, 53, 54 and 55 having inks of different colors and the treatment liquid accommodated so as to be capable of ejecting each liquid through a recording head. These tanks accommodate, for example, black ink (K), yellow ink (Y), magenta ink (M) and cyan ink (C) as the first liquids, and the treatment liquid as the second liquid, which are supplied from the main tank 4

The subsidiary ink tank 5 is provided with an exhaust opening 56 and a feeding opening 57 respectively. When the recording head 3 is transferred to a stand-by position (or a feeding position), an exhaust pin 151 and feeding pin 152 of a feeder 15 are inserted into the exhaust opening 56 and feeding opening 57 respectively thereby allowing the subsidiary ink tank 5 to be connected to the feeder 15. The feeder 15 is connected via a feeding tube 16 to the main ink tank 4, and the ink or the treatment liquid is supplied by the feeder 15 from the main ink tank 4 through the feeding opening 57 into the subsidiary ink tank 5.

The main ink tank 4 also has main ink tanks 41, 42, 43, 44 and 45 having inks of different colors and the treatment liquid accommodated therein. These tanks are filled with, for example, black ink (K), yellow ink (Y), magenta ink (M) and cyan ink (C) as the first liquid and the treatment liquid as the second liquid, and each tank is accommodated so as to be detachable from the image forming apparatus 100.

The feed signal cable 9 and the subsidiary ink tank 5 are connected to the recording head 3, and when external image recording information is inputted from the feed signal cable 9 into the recording head 3, the recording head 3 on the basis of the image recording information suctions a predetermined amount of ink from each ink tank and ejects it onto the surface of the recording medium. The feed signal cable 9 also plays a role in supplying not only image recording information but also electric power necessary for driving the recording head 3 into the recording head 3.

The recording head 3 is arranged and held on a carriage 10, and a guide rod 11 and a timing belt 12 connected to a driving pulley 13 are connected to the carriage 10. By this constitution, the recording head 3 can move, along the guide rod 11, in a direction Y (horizontal scanning direction) parallel to the surface of the recording medium 1 and perpendicular to the delivery direction X (vertical scanning direction) of the recording medium 1.

The image forming apparatus 100 is provided with a controlling means (not shown in the figure) for regulating the driving timing of the recording head 3 and the driving timing of the carriage 10 on the basis of image recording information. An image based on the image recording information can be continuously formed on a predetermined region of the recording medium 1 delivered at a predetermined speed along the delivery direction X.

A maintenance unit 14 is connected via a tube to a depressurizing unit (not shown in the figure). The maintenance unit 14 is connected to a nozzle part of the recording head 3, and has a function of suctioning the ink through a nozzle of the recording head 3 by depressurizing the inside of the nozzle of the recording head 3. Removal of an excess of ink adhering to the nozzle in the image forming apparatus 100 in an actuated state, or prevention of evaporation of ink from the nozzle in the image forming apparatus 100 in a suspended state, can be effected by arranging the maintenance unit 14.

Figure 3:
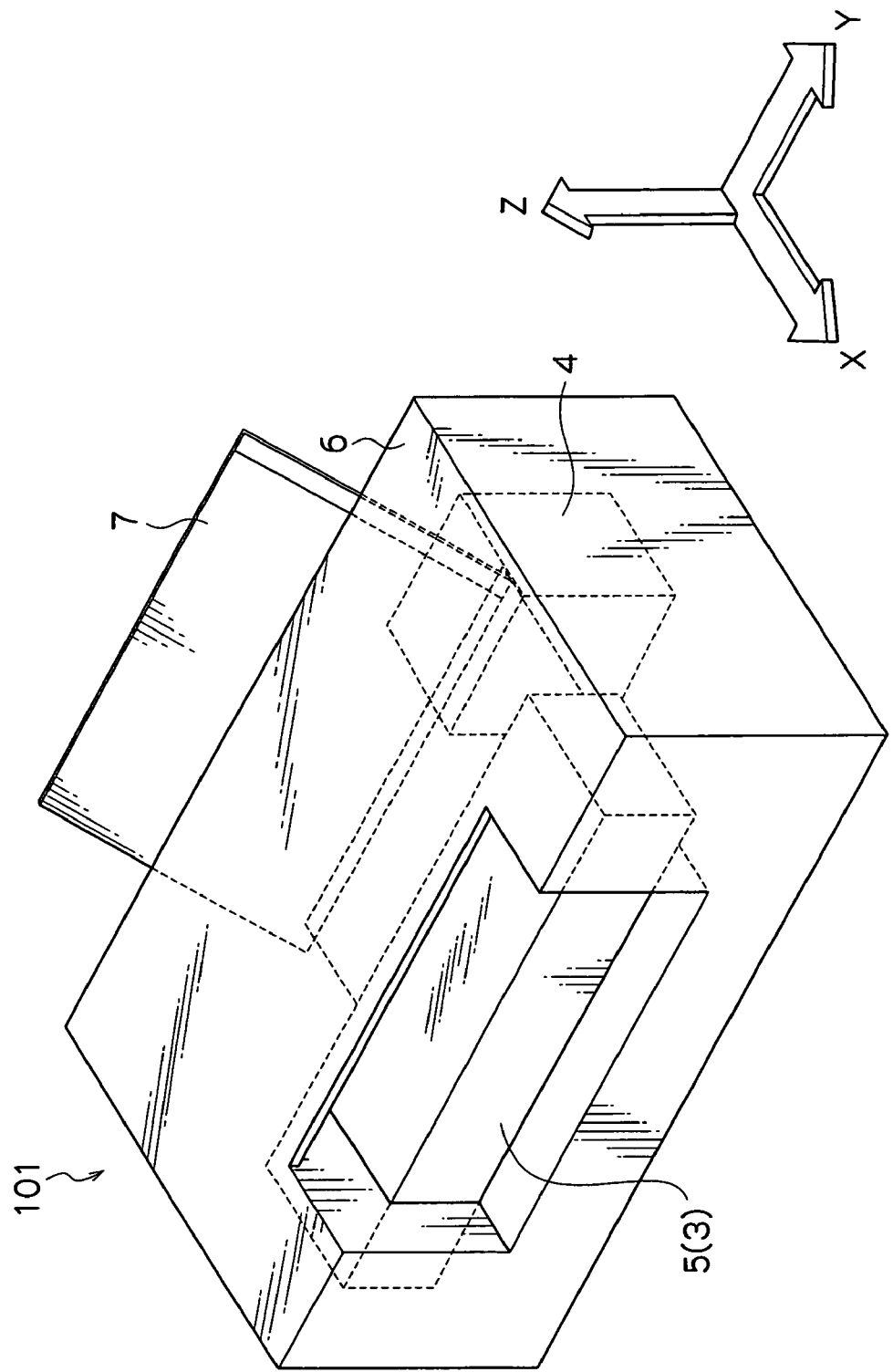
FIG. 3 is a perspective view showing the constitution of an outward appearance of another preferable embodiment of the ink jet recording apparatus of the invention.
Figure 4:
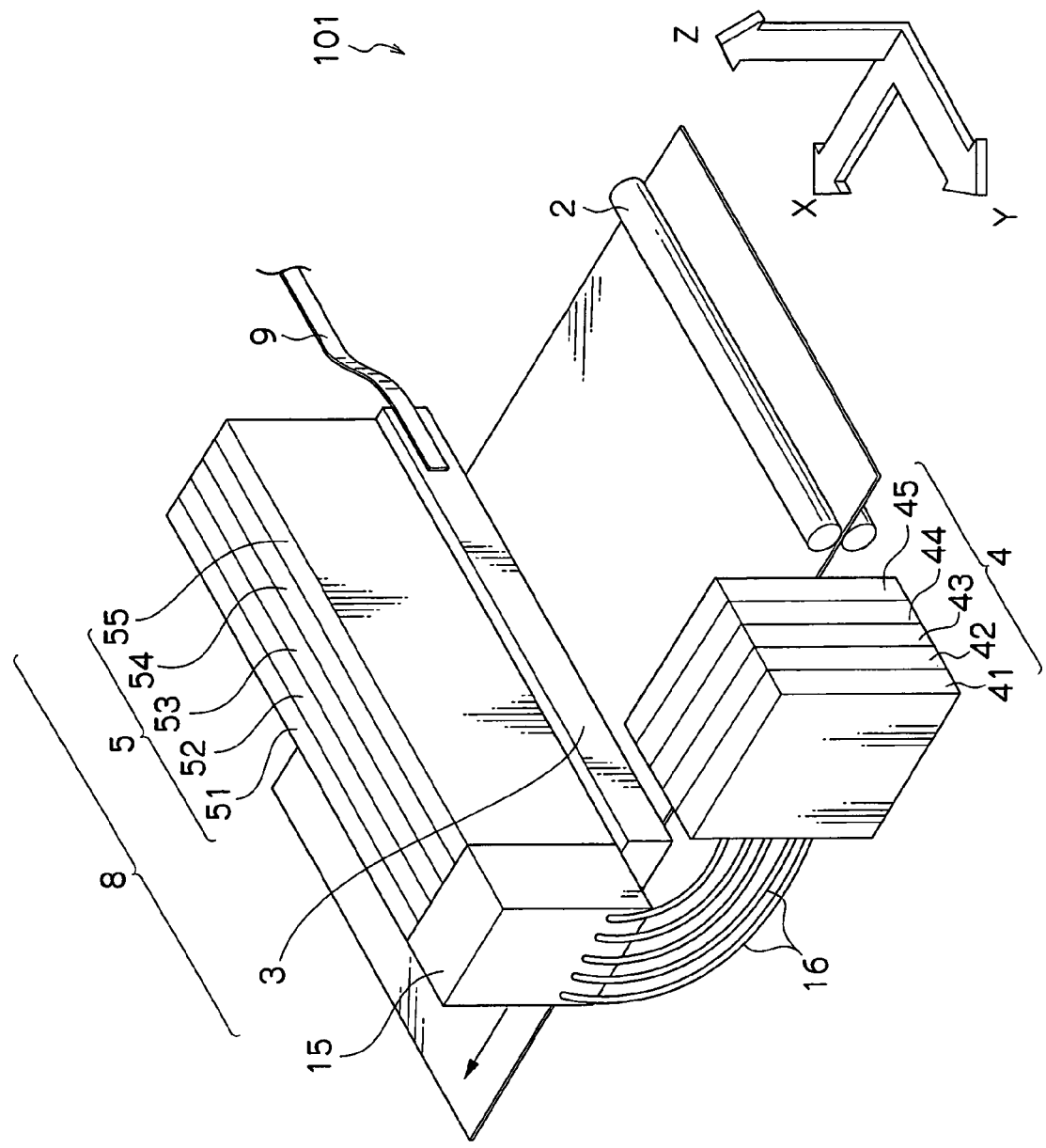
FIG. 4 is a perspective view showing a fundamental constitution in the inside of the ink jet recording apparatus in FIG. 3.

FIG. 3 is a perspective view showing the constitution of an outward appearance of another embodiment of the ink jet recording apparatus of the invention. FIG. 4 is a perspective view showing a fundamental constitution in the inside of the ink jet recording apparatus in FIG. 3 (referred to hereinafter as the image forming apparatus). The image forming apparatus 101 in this embodiment is constituted so as to be actuated on the basis of the ink jet recording method of the invention, to form an image.

The image forming apparatus 101 shown in FIGS. 3 and 4, wherein the width of a recording head 3 is equal to or greater than the width of a recording medium 1, is free of a carriage mechanism, and has a paper feeding mechanism (which may be for example a paper feeding mechanism in a belt system although a delivery roller 2 is shown in this embodiment) in a vertical scanning direction (delivery direction of the recording medium 1: the arrowed X direction).

Although not shown in the figure, nozzles ejecting the respective colors (including the treatment liquid) are arranged in the vertical scanning direction similarly to arrangement of the subsidiary ink tanks 51 to 55 in the vertical scanning direction (delivery direction of the recording medium 1: the arrowed X direction). A description of the other constitution is omitted because it is the same as in the image forming apparatus 100 shown in FIGS. 1 and 2. In the figure, the recording head 3 does not move, so the subsidiary ink tank 5 is constituted to be connected always to a feeder 15, but may be constituted to be connected to the feeder 15 at the time of feeding the ink.

In the image forming apparatus 101 shown in FIGS. 3 and 4, printing in the width direction (horizontal scanning direction) of the recording medium 1 is conducted all at once by the recording head 3, and thus the constitution of this apparatus is made simpler and the printing speed is made higher than in the system having a carriage mechanism.

EXAMPLES

Hereinafter, the invention is described in more detail by reference to the Examples. However, these examples are not intended to limit the invention.

<Pigment Treatment Method 1>

A commercial pigment dispersion liquid is sonicated with an ultrasonic homogenizer. Thereafter, the dispersion liquid is centrifuged (8000 rpm×30 min.), and residues (20% by mass relative to the amount of the initially introduced dispersion liquid) are removed, whereby a pigment dispersion liquid is obtained.

<Pigment Treatment Method 2>

10% by mass of pigment and 1.5% by mass of dispersant are added to, and stirred in, a predetermined amount of ion-exchange water. The resulting mixture is sonicated with an ultrasonic homogenizer, to disperse the pigment. Then, the dispersion liquid is centrifuged (8000 rpm×30 min.), and residues (20% by mass relative to the amount of the initially introduced dispersion liquid) are removed, whereby a pigment dispersion liquid is obtained.

<Pigment Treatment Method 3>

While an aqueous solution of sulfanilic acid is heated, 100 g of pigment is added thereto while the solution being stirred. This mixture is cooled under stirring to room temperature, and 14 g of conc. nitric acid is added dropwise thereto. 10 g of aqueous $NaNO_2$ solution is added to the solution and stirred until the reaction is finished. This pigment is subjected to desalting treatment. Ion-exchange water is added to the resulting surface-treated pigment such that the density of the pigment becomes 12% by mass, and after the pH is adjusted to 7.5, the pigment is dispersed with an ultrasonic homogenizer. The dispersion liquid is centrifuged (8000 rpm×30 min.) by a centrifuge machine, and residues (20% by mass relative to the amount of the initially introduced dispersion liquid) are removed, whereby a pigment dispersion liquid is obtained.

<Method of Preparing the Ink and the Treatment Liquid>

Suitable amounts of a colorant solution, a water-soluble solvent, a surfactant, ion-exchange water etc. are mixed to attain a predetermined composition, and the mixture is stirred. The resulting liquid is passed through a 5 μm filter to give the desired liquid.

(Ink A)

The pigment treated according to the pigment treatment method 1 is used to prepare ink A by the predetermined method.

—Composition—

Cabojet-300 (manufactured by Cabot Corporation): 4% by mass
Styrene/acrylic acid/sodium acrylate copolymer: 1% by mass (weight-average molecular weight: 4500)
Diethylene glycol: 20% by mass
Propylene glycol: 5% by mass
Acetylene glycol/ethylene oxide adduct: 1% by mass
Ion-exchange water: the remaining balance This ink has a viscosity of 3.2 mPa·s, a surface tension of 32 mN/m, and a volume-average particle diameter of 96 nm.

(Ink B)

The pigment treated according to the pigment treatment method 2 is used to prepare ink B by the predetermined method.

—Composition—

Black Perls L (manufactured by Cabot Corporation): 4% by mass
Styrene/acrylic acid/sodium acrylate copolymer: 0.75% by mass (weight-average molecular weight: 6000)
Diethylene glycol: 20% by mass
Ethylene glycol: 5% by mass
Polyoxyethylene isostearyl ether: 0.75% by mass
Ion-exchange water: the remaining balance This ink has a viscosity of 3.2 mPa·s, a surface tension of 30 mN/m, and a volume-average particle diameter of 115 nm.

(Ink C)

The pigment treated according to the pigment treatment method 3 is used to prepare ink C by the predetermined method.

—Composition—

C. I. Pigment Blue—15:3:5% by mass
Styrene/acrylic acid/sodium acrylate copolymer: 0.6% by mass (weight-average molecular weight 4000)
Diethylene glycol: 20% by mass
Glycerin: 5% by mass
Polyoxyethylene 2-ethyl hexyl ether: 0.75% by mass
Ion-exchange water: the remaining balance This ink has a viscosity of 3.1 mPa·s, a surface tension of 30 mN/m, and a volume-average particle diameter of 92 nm.

(Ink D)

The pigment treated according to the pigment treatment method 3 is used to prepare ink D by the predetermined method.

—Composition—

C. I. Pigment Red-122:4% by mass
Styrene/acrylic acid/sodium acrylate copolymer: 1% by mass (weight-average molecular weight:7500)
Diethylene glycol: 15% by mass
Propylene glycol: 5% by mass
Butyl carbitol: 2% by mass
Acetylene glycol/ethylene oxide adduct: 0.75% by mass
Ion-exchange water: the remaining balance This ink has a viscosity of 3.4 mPa·s, a surface tension of 31 mN/m, and a volume-average particle diameter of 73 nm.

(Ink E)

The pigment treated according to the pigment treatment method 3 is used to prepare ink E by the predetermined method.

—Composition—
C. I. Pigment Yellow-128: 4% by mass
Styrene/acrylic acid/sodium acrylate copolymer: 1% by mass (weight-average molecular weight: 6000)
Diethylene glycol: 20% by mass
Sulforane: 5% by mass
Polyoxyethylene-2-ethyl hexyl ether: 0.8% by mass
Ion-exchange water: the remaining balance This ink has a viscosity of 3.3 mPa·s, a surface tension of 32 mN/m, and a volume-average particle diameter of 76 nm.

(Treatment Liquid A)

—Composition—
Diethylene glycol: 10% by mass
2-Furan carboxylic acid (pKa=2.4; fundamental skeleton SP value=9.23): 8% by mass
Sodium hydroxide: 0.8% by mass
Diglycerin/ethylene oxide adduct (weight-average molecular weight: 4500; SP value: 9.74): 8% by mass
Acetylene glycol/ethylene oxide adduct: 1% by mass
Ion-exchange water: the remaining balance This treatment liquid has a pH value of 3.8, a viscosity of 2.7 mPa·s, and a surface tension of 31 mN/m.

(Treatment Liquid B)

—Composition—
Diethylene glycol: 15% by mass
2-Pyrrolidone-5-carboxylic acid (pKa=2.4; fundamental skeleton SP value=11.18): 8% by mass
Sodium hydroxide: 0.9% by mass
Polyvinyl pyrrolidone (weight-average molecular weight: 10000; SP value: 12.80): 5% by mass
Acetylene glycol/ethylene oxide adduct: 1% by mass
Ion-exchange water: the remaining balance This treatment liquid has a pH value of 3.6, a surface tension of 30 mN/m, and a viscosity of 2.8 mPa·s.

(Treatment Liquid C)

—Composition—
Diethylene glycol: 10% by mass
Citric acid (pKa=2.87; fundamental skeleton SP value=11.59): 12% by mass
Magnesium nitrate.6H$_2$O: 4% by mass
Sodium hydroxide: 0.9% by mass
Diglycerin/ethylene oxide adduct (weight-average molecular weight: 750; SP value: 11.56): 8% by mass
Acetylene glycol/ethylene oxide adduct: 1% by mass
Ion-exchange water: the remaining balance This treatment liquid has a pH value of 3.4, a surface tension of 28 mN/m, and a viscosity of 2.9 mPa·s.

(Treatment Liquid D)

—Composition —
Diethylene glycol: 20% by mass
2-Pyrrolidone-5-carboxylic acid (pKa=2.4; fundamental skeleton SP value=11.18): 8% by mass
Magnesium nitrate.6H$_2$O: 2% by mass
Sodium hydroxide: 0.9% by mass
Diglycerin/propylene oxide adduct (weight-average molecular weight: 750; SP value: 10.90): 7.5% by mass
Acetylene glycol/ethylene oxide adduct: 1% by mass
Ion-exchange water: the remaining balance This treatment liquid has a pH value of 3.8, a surface tension of 29 mN/m, and a viscosity of 3.2 mPa·s.

(Treatment Liquid E)

—Composition—
Diethylene glycol: 10% by mass
2-Pyrrolidone-5-carboxylic acid (pKa=2.4; fundamental skeleton SP value=11.18): 8% by mass
Sodium hydroxide: 0.6% by mass
Diglycerin/propylene oxide adduct (weight-average molecular weight: 750; SP value: 10.90): 1.2% by mass
Acetylene glycol/ethylene oxide adduct: 1% by mass
Ion-exchange water: the remaining balance This treatment liquid has a pH value of 2.1, a surface tension of 28 mN/m, and a viscosity of 1.7 mPa·s.

(Treatment Liquid F)

—Composition —
Butyl carbitol: 10% by mass
2-Pyrrolidone-5-carboxylic acid (pKa=2.4; fundamental skeleton SP value=11.18): 8% by mass
Sodium hydroxide: 2% by mass
Diglycerin/propylene oxide adduct (weight-average molecular weight: 750; SP value: 10.90): 12% by mass
Acetylene glycol/ethylene oxide adduct: 1% by mass
Ion-exchange water: the remaining balance This treatment liquid has a pH value of 4.7, a surface tension of 26 mN/m, and a viscosity of 3.8 mPa·s.

(Treatment Liquid G)

—Composition —
2-Pyrrolidone-5-carboxylic acid (pKa=4.0; fundamental skeleton SP value=11.18): 8% by mass
Sodium hydroxide: 1.5% by mass
Diglycerin/ethylene oxide adduct (weight-average molecular weight: 4500; SP value: 9.74): 16% by mass
Acetylene glycol/ethylene oxide adduct: 1% by mass
Ion-exchange water: the remaining balance This treatment liquid has a pH value of 4.0, a surface tension of 30 mN/m, and a viscosity of 2.7 mPa·s.

(Treatment Liquid H)

—Composition—
Diethylene glycol: 20% by mass
Acetic acid (pKa=4.56; fundamental skeleton SP value=5.80): 8% by mass
Sodium hydroxide: 1.5% by mass
Butyl carbitol (weight-average molecular weight: 162.23; SP value: 10.51): 10% by mass
Acetylene glycol/ethylene oxide adduct: 1% by mass
Ion-exchange water: the remaining balance This treatment liquid has a pH value of 6.0, a surface tension of 28 mN/m, and a viscosity of 2.8 mPa·s.

(Treatment Liquid I)

—Composition—
Diethylene glycol: 25% by mass
Citric acid (pKa=2.87; fundamental skeleton SP value=11.59): 10% by mass
Sodium hydroxide: 0.9% by mass
Ethyl carbitol (weight-average molecular weight: 134.18; SP value: 10.94): 5% by mass
Acetylene glycol/ethylene oxide adduct: 1% by mass
Ion-exchange water: the remaining balance This treatment liquid has a pH value of 3.4, a surface tension of 29 mN/m, and a viscosity of 2.7 mPa·s.

(Treatment Liquid J)

—Composition—
Diethylene glycol: 10% by mass
Nicotinic acid (pKa=2.1; fundamental skeleton SP value=9.27): 8% by mass
Sodium hydroxide: 0.9% by mass
Polyethylene oxide (weight-average molecular weight: 194,000; SP value: 9.37): 10% by mass
Acetylene glycol/ethylene oxide adduct: 1% by mass
Ion-exchange water: the remaining balance This treatment liquid has a pH value of 3.9, a surface tension of 32 mN/m, and a viscosity of 26.1 mPa·s.

(Treatment Liquid K)

—Composition—
Diethylene glycol: 25% by mass
2-Pyrrolidone (weight-average molecular weight: 85.1; SP value: 11.18): 2.5% by mass
2-Pyrrolidone-5-carboxylic acid (pKa=2.4; fundamental skeleton SP value=11.18): 8% by mass
Sodium hydroxide: 0.9% by mass
Acetylene glycol/ethylene oxide adduct: 1% by mass
Ion-exchange water: the remaining balance This treatment liquid has a pH value of 4.0, a surface tension of 28 mN/m, and a viscosity of 2.9 mPa·s.

(Treatment Liquid L)

—Composition—
Diethylene glycol: 25% by mass
2-Pyrrolidone (weight-average molecular weight: 85.1; SP value: 11.18): 2.5% by mass
1 N hydrochloric acid: 20% by mass
Acetylene glycol/ethylene oxide adduct: 1% by mass
Ion-exchange water: the remaining balance This treatment liquid has a pH value of 0.92, a surface tension of 28 mN/m, and a viscosity of 2.9 mPa·s.

(Treatment Liquid M)

—Composition—
Diethylene glycol: 20% by mass
2-Furan carboxylic acid (pKa=2.4; fundamental skeleton SP value=9.23): 8% by mass
Sodium hydroxide: 0.8% by mass
Polyvinyl pyrrolidone (weight-average molecular weight: 10000; SP value: 12.80): 5% by mass
Acetylene glycol/ethylene oxide adduct: 1% by mass
Ion-exchange water: the remaining balance This treatment liquid has a pH value of 3.8, a viscosity of 3.2 mPa·s, and a surface tension of 32 mN/m.

Examples 1 to 7 and Comparative Examples 1 to 7

Figure 5A:
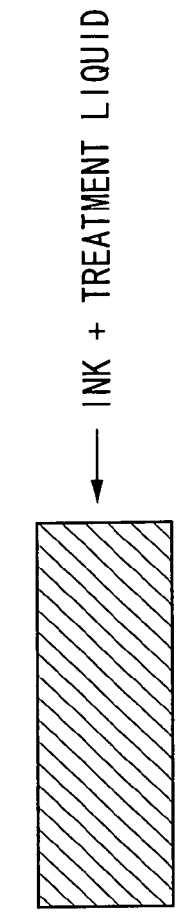
FIG. 5A is a schematic view showing a print pattern in evaluation in the Examples.
Figure 5B:
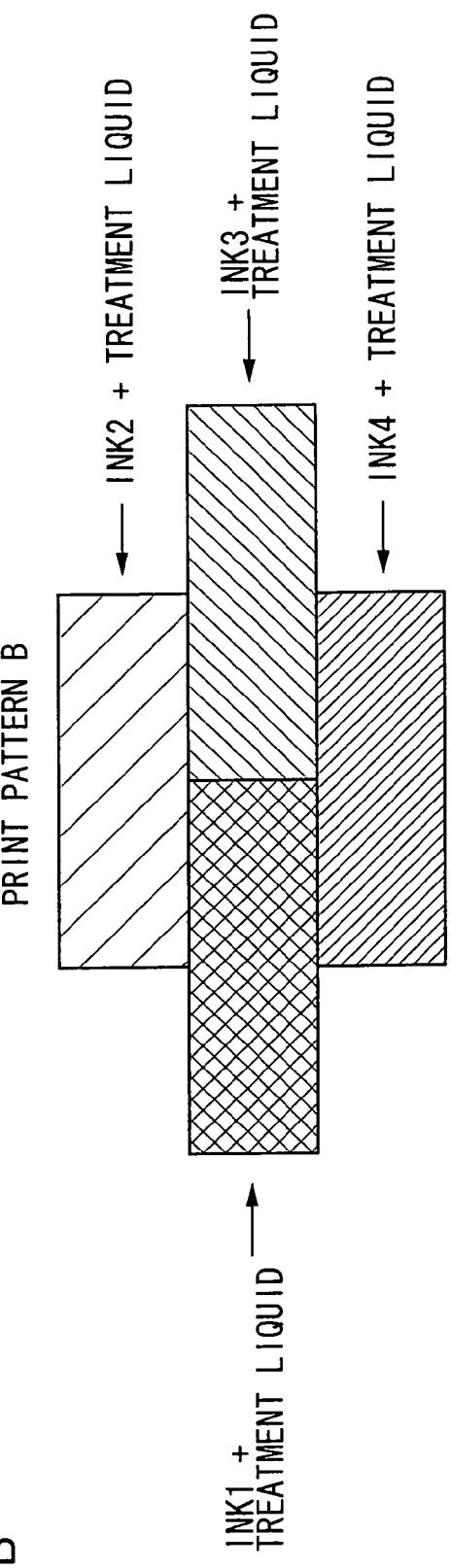
FIG. 5B is a schematic view showing a print pattern in evaluation in the Examples.

The ink sets according to Tables 1 and 3 are used. The ink sets in Table 1 are used to print the following print pattern A, while the ink sets in Table 3 are used to print the following print pattern B. Printing is carried out by a method wherein a 800 dpi print head (one drop, 14 ng) having 256 nozzles, produced for experiment, is used to eject the ink and/or the treatment liquid in accordance with the print pattern onto FX-$C^2$ paper (produced by Fuji Xerox Co., Ltd.). Printing is carried out in a general environment (temperature of 23±0.5° C., relative humidity of 55±5%). When the ink and the treatment liquid are ejected, the ink/treatment liquid ratio for forming one pixel is 1/0.2 by mass. Evaluation is conducted by preparing a printing sample with the print pattern A shown in FIG. 5A for evaluation of a single-color ink or with the print pattern B shown in FIG. 5B for evaluation of an ink set for a plurality of colors, then leaving the printing sample under the general environment for 24 hours after printing, and examining the sample (excluding drying time, initial ejecting, and ejecting after long-term storage). Table 1 also shows the number of particles (number/μL) having a coarseness of 5 μm or more upon mixing the ink with the treatment liquid.

<<Optical Density>>

The printed parts of each print pattern are measured for optical density by an X-rite 404 (manufactured by X-rite Incorporated). When not every printed part of a print pattern satisfies a certain criterion, the lower criterion is applied to the sample (For example, when the printed parts are partially Δ and the remainder of the printed parts is ○, then the sample is evaluated as Δ.). This applies to the evaluation criteria in all of the evaluation methods below.

—Evaluation Criteria (Black Ink)—
◎: Optical density of 1.45 or more
○: Optical density of 1.4 or more
Δ: Optical density of at least 1.3 and less than 1.4
X: Optical density of less than 1.3

—Evaluation Criteria (Color Ink)—
◎: Optical density of 1.2 or more
○: Optical density of 1.1 or more
Δ: Optical density of at least 1.0 and less than 1.1
X: Optical density of less than 1.0

<<Intercolor Bleeding>>

In evaluation of intercolor bleeding, a pattern having different adjacent colors is printed, and the degree of bleeding in the boundary between the colors is compared with those of predetermined limit specimens and evaluated sensorily.

—Evaluation Criteria—
◎: No bleeding can be recognized.
○: A small degree of bleeding occurs.
Δ: Bleeding occurs within an allowable level.
X: Bleeding occurs significantly over an allowable level.

<<Bleeding>>

A thin-line pattern is printed, and the degree of bleeding in the printed part is compared with those of the limit specimens and evaluated sensorily.

—Evaluation Criteria—
◎: No bleeding can be recognized.
○: A small degree of bleeding occurs.
Δ: Bleeding occurs within an allowable level.
X: Bleeding occurs significantly over an allowable level.

<<Drying Time>>

A 100% coverage pattern is printed and left for a predetermined amount of time, then another sheet of FX-$C^2$ paper is pressed with a load of $1.9 \times 10^4$ N/m² against the print pattern. The time that elapses until the liquid ceases to transfer to the side of the pressed FX-$C^2$ paper is indicated as drying time.

—Evaluation Criteria—
◎: Drying time of less than 0.5 second
○: Drying time of less than 1 second
Δ: Drying time of at least 1 second and less than 5 seconds
X: Drying time of 5 seconds or more <<Initial Ejecting>>

With respect to initial ejecting, the ink jet recording apparatus is charged with the ink and the treatment liquid and used in printing with $5\times10^4$ pulses per nozzle in the general environment. Thereafter, a nozzle check pattern is printed, and the number of ejecting nozzles is counted.

—Evaluation Criteria—
⊚: The liquid is ejected through all of the nozzles.
◯: The liquid is ejected through at least 90% of the nozzles.
Δ: The liquid is ejected through at least 80% and less than 90% of the nozzles.
X: The liquid is ejected through less than 80% of the nozzles.

<<Ejecting After Long-term Storage>>

With respect to ejecting after long-term storage, the ink jet recording apparatus is charged with the ink and the treatment liquid and stored for 1 year in the general environment. After the recording apparatus is started up, a nozzle check pattern is printed, and the number of ejecting nozzles is counted.

—Evaluation Criteria—
⊚: The liquid is ejected through all of the nozzles.
◯: The liquid is ejected through at least 90% of the nozzles.
Δ: The liquid is ejected through at least 80% and less than 90% of the nozzles.
X: The liquid is ejected through less than 80% of the nozzles.

<Summary of Evaluation Results>

The evaluation results are summarized in Tables 2 and 3. As is evident from Tables 2 and 3, the constitution in the examples of the invention is excellent with respect to optical density, bleeding, intercolor bleeding, drying time and ejecting stability.

TABLE 1

| | | Treatment liquid | | | | | | Ink | | Number of particles having a coarseness of |
|---|---|---|---|---|---|---|---|---|---|---|
| | Ink | Treatment liquid | pH | Molecular weight of nonionic substance | Difference in SP value[1] | Amount of nonionic substance added (% by mass) | Viscosity (mPa·s) | Surface tension (mN/m) | Viscosity (mPa·s) | Surface tension (mN/m) | 5 μm or more upon mixing (number/μL) |
| Example 1 | A | A | 3.8 | 4,500 | 0.51 | 8 | 2.7 | 31 | 3.2 | 32 | 126,000 |
| Example 2 | C | B | 3.6 | 10,000 | 1.62 | 5 | 2.8 | 30 | 3.1 | 30 | 85,000 |
| Example 3 | D | C | 3.4 | 750 | 0.03 | 8 | 2.9 | 28 | 3.4 | 31 | 164,000 |
| Example 4 | E | D | 3.8 | 750 | 0.28 | 7.5 | 3.2 | 29 | 3.3 | 32 | 131,000 |
| Example 5 | B | E | 2.1 | 750 | 0.28 | 1.2 | 1.7 | 28 | 3.2 | 30 | 4,800,000 |
| Example 6 | B | F | 4.7 | 750 | 0.28 | 12 | 3.8 | 26 | 3.2 | 30 | 6,700 |
| Comparative Example 1 | A | G | 4.0 | 4,500 | 1.44 | 16 | 2.7 | 30 | 3.2 | 32 | 48,000 |
| Comparative Example 2 | A | H | 6.0 | 162.23 | 4.71 | 10 | 2.8 | 28 | 3.2 | 32 | 800 |
| Comparative Example 3 | A | I | 3.4 | 134.18 | 0.65 | 5 | 2.7 | 29 | 3.2 | 32 | 210,000 |
| Comparative Example 4 | A | J | 3.9 | 194,000 | 0.1 | 10 | 26.1 | 32 | 3.2 | 32 | 72,000 |
| Comparative Example 5 | A | K | 4.0 | 85.1 | 0 | 2.5 | 2.9 | 28 | 3.2 | 32 | 62,000 |
| Comparative Example 6 | A | L | 0.92 | 85.1 | —[2] | 2.5 | 2.9 | 28 | 3.2 | 32 | 5,650,000 |
| Comparative Example 7 | A | M | 3.8 | 10,000 | 3.57 | 5 | 3.2 | 32 | 3.2 | 32 | 94,000 |

[1] Difference in SP value: Difference in SP value (absolute value) between a fundamental skeleton part of the organic acid and the nonionic substance.
[2] The organic acid is not added.

TABLE 2

| | Optical density | Bleeding | Drying time | Initial ejecting | Ejecting after long-term storage |
|---|---|---|---|---|---|
| Example 1 | ⊚ | ⊚ | ⊚ | ⊚ | ⊚ |
| Example 2 | ⊚ | ⊚ | ⊚ | ⊚ | ◯ |
| Example 3 | ⊚ | ⊚ | ⊚ | ⊚ | ◯ |
| Example 4 | ⊚ | ⊚ | ⊚ | ⊚ | ◯ |
| Example 5 | ◯ | ⊚ | ⊚ | ⊚ | ◯ |
| Example 6 | ◯ | ◯ | ⊚ | ◯ | ⊚ |
| Comparative Example 1 | ⊚ | ⊚ | ⊚ | X | X |
| Comparative Example 2 | X | X | ⊚ | ⊚ | ⊚ |
| Comparative Example 3 | ⊚ | ⊚ | ⊚ | ⊚ | X |
| Comparative Example 4 | X | X | ◯ | X | X |
| Comparative Example 5 | ⊚ | ◯ | ⊚ | ⊚ | X |
| Comparative Example 6 | X | ⊚ | ⊚ | ⊚ | X |
| Comparative Example 7 | ⊚ | ⊚ | ⊚ | ◯ | X |

TABLE 3

| | Ink 1 | Ink 2 | Ink 3 | Ink 4 | Treatment liquid | Optical density | Intercolor bleeding | Bleeding |
|---|---|---|---|---|---|---|---|---|
| Example 7 | A | C | D | E | A | ○ | ◎ | ◎ |

According to the invention, a treatment liquid for ink jet and an ink set for ink jet excellent in ejecting stability can be provided as described above. A treatment liquid tank for ink jet, an ink tank for ink jet, an ink jet recording method and an ink jet recording apparatus, utilizing the treatment liquid for ink jet and the ink set for ink jet, can also be provided.

What is claimed is:

1. A treatment liquid for ink jet, comprising at least an organic acid having a pKa value of 4.5 or less, a nonionic substance, and water, wherein:
   (I) the treatment liquid has a pH value of 1.5 to 5.5,
   (II) the nonionic substance has a weight-average molecular weight of 300 or more but less than 5,000, and
   (III) a difference in solubility parameter (SP value) between a fundamental skeleton part of the organic acid excluding its acid group and the nonionic substance is 0.01 to 0.75.

2. A treatment liquid for ink jet, comprising at least an organic acid having a pKa value of 4.5 or less, a nonionic substance, and water, wherein:
   (I) the treatment liquid has a pH value of 1.5 to 5.5,
   (II) the nonionic substance has a weight-average molecular weight of 5,000 to 100,000, and
   (III) a difference in solubility parameter (SP value) between a fundamental skeleton part of the organic acid excluding its acid group and the nonionic substance is 0.01 to 2.

3. The treatment liquid of claim 1, wherein the organic acid having a pKa value of 4.5 or less is at least one selected from the group consisting of citric acid, glycine, glutamic acid, succinic acid, tartaric acid, phthalic acid, pyrrolidone carboxylic acid, pyrone carboxylic acid, pyrrole carboxylic acid, furan carboxylic acid, pyridine carboxylic acid, coumaric acid, thiophene carboxylic acid, nicotinic acid, derivatives thereof, and salts thereof.

4. The treatment liquid of claim 2, wherein the organic acid having a pKa value of 4.5 or less is at least one selected from the group consisting of citric acid, glycine, glutamic acid, succinic acid, tartaric acid, phthalic acid, pyrrolidone carboxylic acid, pyrone carboxylic acid, pyrrole carboxylic acid, furan carboxylic acid, pyridine carboxylic acid, coumaric acid, thiophene carboxylic acid, nicotinic acid, derivatives thereof, and salts thereof.

5. The treatment liquid of claim 1, wherein an amount of the nonionic substance contained is 1.5% by mass to 15% by mass based on a total mass of the treatment liquid.

6. The treatment liquid of claim 2, wherein an amount of the nonionic substance contained is 1.5% by mass to 15% by mass based on a total mass of the treatment liquid.

7. The treatment liquid of claim 1, further comprising a water-soluble solvent.

8. The treatment liquid of claim 2, further comprising a water-soluble solvent.

9. A treatment liquid tank for ink jet, comprising the treatment liquid of claim 1 accommodated therein.

10. An ink set for ink jet, comprising at least: an ink containing a pigment, a water-soluble solvent, and water; and the treatment liquid of claim 1.

11. An ink tank for ink jet, comprising the ink set of claim 10 accommodated therein.

12. An ink jet recording method using the ink set of claim 10, comprising applying the ink and the treatment liquid onto a recording medium such that the ink and the treatment liquid come in contact with each other to form an image.

13. The ink jet recording method of claim 12, wherein the ink and the treatment liquid are applied onto the recording medium in an amount of 0.01 ng to 25 ng per drop.

14. The ink jet recording method of claim 12, wherein a mass ratio of the applied ink to the applied treatment liquid to form one pixel is in the range of from 1:10 to 10:1.

15. The ink jet recording method of claim 12, wherein the ink and the treatment liquid, which are supplied from an ink tank accommodating the ink set, are ejected onto the recording medium.

16. An ink jet recording apparatus comprising a recording head for ejecting an ink and a treatment liquid of an ink set onto a recording medium, wherein the ink set is the ink set of claim 10, and the ink and the treatment liquid are applied onto the recording medium so as to come in contact with each other to form an image.

17. The ink jet recording apparatus of claim 16, wherein the ink and the treatment liquid are applied onto the recording medium in an amount of 0.01 ng to 25 ng per drop.

18. The ink jet recording apparatus of claim 16, wherein a mass ratio of the applied ink to the applied treatment liquid to form one pixel is in the range of from 1:10 to 10:1.

19. The ink jet recording apparatus of claim 16, further comprising an ink tank for accommodating the ink set and supplying the accommodated ink and treatment liquid to the recording head.

* * * * *